(12) United States Patent
Endo et al.

(10) Patent No.: US 7,830,895 B2
(45) Date of Patent: Nov. 9, 2010

(54) PACKET COMMUNICATION APPARATUS WITH FUNCTION ENHANCEMENT MODULE

(75) Inventors: Hideki Endo, Hachioji (JP); Kunihiko Toumura, Hachioji (JP); Toshiaki Suzuki, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 1310 days.

(21) Appl. No.: 11/328,106

(22) Filed: Jan. 10, 2006

(65) Prior Publication Data

US 2006/0203832 A1 Sep. 14, 2006

(30) Foreign Application Priority Data

Mar. 9, 2005 (JP) ............................. 2005-065492

(51) Int. Cl.
H04L 12/56 (2006.01)

(52) U.S. Cl. ................. 370/401; 717/172; 717/173; 709/221

(58) Field of Classification Search ................. 370/401, 370/395.4, 409, 389; 717/168–173; 709/221, 709/217

See application file for complete search history.

(56) References Cited

U.S. PATENT DOCUMENTS

| 4,468,729 | A | * | 8/1984 | Schwartz | ............... | 711/172 |
|---|---|---|---|---|---|---|
| 6,009,274 | A | * | 12/1999 | Fletcher et al. | ............... | 717/173 |
| 6,687,901 | B1 | * | 2/2004 | Imamatsu | ............... | 717/173 |
| 7,107,329 | B1 | * | 9/2006 | Schroder et al. | ............... | 709/221 |
| 7,536,683 | B2 | * | 5/2009 | Zimmerman et al. | ............... | 717/162 |
| 2003/0161319 | A1 | * | 8/2003 | Okagawa et al. | ............... | 370/395.4 |
| 2003/0177209 | A1 | * | 9/2003 | Kwok et al. | ............... | 709/221 |
| 2003/0193685 | A1 | * | 10/2003 | Kageyama | ............... | 358/1.14 |
| 2004/0071142 | A1 | | 4/2004 | Moriwaki et al. | | |
| 2004/0088696 | A1 | * | 5/2004 | Kawano et al. | ............... | 717/171 |
| 2004/0184453 | A1 | | 9/2004 | Moriwaki | | |
| 2004/0194081 | A1 | * | 9/2004 | Qumei et al. | ............... | 717/173 |
| 2005/0081158 | A1 | * | 4/2005 | Hwang | ............... | 715/740 |
| 2005/0232262 | A1 | | 10/2005 | Toumura | | |
| 2008/0320221 | A1 | * | 12/2008 | Fujii | ............... | 711/114 |

FOREIGN PATENT DOCUMENTS

| EP | 1 365 546 A1 | 5/2002 |
|---|---|---|
| JP | 2003-258842 | 2/2002 |
| JP | 2003-338834 | 10/2002 |
| JP | 2004-135106 | 10/2002 |
| JP | 2004-289223 | 3/2003 |
| JP | 2005-167761 | 12/2003 |

* cited by examiner

Primary Examiner—Dang T Ton
Assistant Examiner—Mandish Randhawa
(74) Attorney, Agent, or Firm—Stites & Harbison, PLLC; Juan Carlos A. Marquez, Esq

(57) ABSTRACT

A packet communication apparatus comprising a node management processor for controlling the whole apparatus, network interfaces for transmitting and receiving packets to and from external networks, function enhancement modules for performing predetermined processes on the packets, and a switch for transferring the packets within the apparatus. The network interface includes a CPU and a memory, the memory stores a program executed by the CPU, the CPU processes the packet received from the external networks by executing the program, and the function enhancement module stores the program stored in the memory.

19 Claims, 29 Drawing Sheets

FUNCTION ENHANCEMENT MODULE

INTERNAL ADDRESS : CORRESPONDING UNIT

| | |
|---|---|
| 1 | : NODE MANAGEMENT PROCESSOR |
| 2 | : INTERNAL SWITCH |
| 3 | : NIF (1) |
| 4 | : NIF (2) |
| | . . . |
| 7 | : MODULE I/F (1) |
| 8 | : MODULE I/F (2) |
| | . . . |
| 11 | : FUNCTION ENHANCEMENT MODULE (1) |
| 12 | : FUNCTION ENHANCEMENT MODULE (2) |
| | . . . |

ASSOCIATION BETWEEN THE UNITS CONFIGURING THE APPARATUS
AND THE INTERNAL ADDRESSES

*FIG. 4A*

| DESTINATION INTERNAL -ADDRESS | HEADER INFORMATION | | PROCESS CONTENT |
|---|---|---|---|
| | PAYLOAD TYPE | IP ADDRESS/PREFIX LENGTH | |
| 3 | | AA.AA.AA.AA/a | CORRESPONDING EXTERNAL I/F |
| ... | | ... | ... |
| OTHER THAN 3 | | | DISCARD |
| | PPPoE | XX.XX.XX.XX/x | 11(PROGRAM 1.5.1) |
| | IP | YY.YY.YY.YY/y | 3(PROGRAM 2.0.1) |
| | IP | ZZ.ZZ.ZZ.ZZ/z | 4(PROGRAM 2.0.1) |
| | IP | ... | 12(PROGRAM 3.2.1) |
| ... | ... | | ... |

FORWARDING TABLE OF NIF

FIG. 4B

| NODE MANAGEMENT PROCESSOR PROCESSING CODE ~701 | PROCESS CONTENT ~702 |
|---|---|
| 0 | A FUNCTION ENHANCEMENT MODULE IS ADDED → THE NIF FOR INSTALLING A PROGRAM IS DETERMINED AND THE PROGRAM IS TRANSMITTED |
| 1 | THE PROGRAM IS REQUESTED FROM THE NIF → OPERATION OF OBTAINING THE PROGRAM |
| 2 | THE PROGRAM OR THE INFORMATION RELATING TO THE LOCATION OF THE PROGRAM IS RECEIVED FROM THE FUNCTION ENHANCEMENT MODULE → THE PROGRAM OR THE INFORMATION RELATING TO THE LOCATION OF THE PROGRAM IS TRANSMITTED TO THE NIF |
| 3 | THE NIF-PROGRAM MANAGEMENT TABLE IS UPDATED BY USING THE INFORMATION OF THE PAYLOAD |

700

NODE MANAGEMENT PROCESSOR PROCESSING CODE MANAGEMENT TABLE

FIG. 5A

| PROGRAM OBTAINING CODE ~711 | OBTAINING METHOD ~712 |
|---|---|
| 0 | THE PROGRAM HAS BEEN STORED IN THE PAYLOAD |
| 1 | THE INFORMATION RELATING TO THE LOCATION OF THE PROGRAM HAS BEEN STORED IN THE PAYLOAD |
| 2 | THE PROGRAM NAME HAS BEEN STORED IN THE PAYLOAD |

710

PROGRAM OBTAINING CODE MANAGEMENT TABLE

FIG. 5B

| NIF SPECIFICATION CODE ~721 | DESTINATION ~722 |
|---|---|
| 0 | ALL THE NIFS |
| 1 | THE NIF SPECIFIED BY THE OPERATOR |

NIF SPECIFICATION CODE MANAGEMENT TABLE 720

FIG. 5C

| PACKET SPECIFICATION CODE ~731 | PACKET KIND ~732 |
|---|---|
| 1 | PPPoE |
| 2 | IP(XX.XX.XX.XX/x) |
| 3 | IP(YY.YY.YY.YY/y) |
| ... | ... |
| 8 | SPECIAL PACKET OTHER THAN THE ABOVE KINDS |

PACKET SPECIFICATION CODE MANAGEMENT TABLE 730

FIG. 5D

NIF – PROGRAM MANAGEMENT TABLE

| NIF NUMBER (rem) \ PROGRAM NAME (ref) | 1.5.1 (4) | 2.0.1 (3) | 3.2.1 (1) | 5.2.0 (1) |
|---|---|---|---|---|
| NIF (1) (60%) | ○ | ○ |  | ○ |
| NIF (2) (60%) | ○ | ○ |  | ○ |
| NIF (3) (80%) | ○ |  | ○ |  |

NIF – PROGRAM MANAGEMENT TABLE   800

FIG. 6A

NIF PROCESSING CODE MANAGEMENT TABLE

| NIF PROCESSING CODE | NIF PROCESSING CONTENT |
|---|---|
| 0 | THE PROGRAM STORED IN THE PAYLOAD IS INSTALLED AND THE FORWARDING TABLE IS UPDATED |
| 1 | THE FORWARDING TABLE IS UPDATED ON THE BASIS OF THE INFORMATION OF THE PAYLOAD |
| 2 | THE PROGRAM SPECIFIED IN THE PAYLOAD IS DELETED AND THE FORWARDING TABLE IS UPDATED |

NIF PROCESSING CODE MANAGEMENT TABLE   740

FIG. 6B

| UPDATE CODE (751) | NIF UPDATING CONTENT (752) |
|---|---|
| 0 | A PATH IS ADDED TO THE FORWARDING TABLE |
| 1 | UPDATE CODE MANAGEMENT TABLE |

A PATH IS DELETED FROM THE FORWARDING TABLE  750

FIG. 6C

| PROGRAM SPECIFICATION CODE (761) | TRANSMISSION PROGRAM (762) |
|---|---|
| 0 | ALL THE PROGRAMS |
| 1 | THE PROGRAM SPECIFIED BY THE OPERATOR |
| 2 | THE PROGRAM SPECIFIED IN THE PAYLOAD |

PROGRAM SPECIFICATION CODE MANAGEMENT TABLE  760

FIG. 7A

| MODULE PROCESSING CODE (771) | MODULE PROCESSING CONTENT (772) |
|---|---|
| 0 | THE LOCATION INFORMATION OF THE PROGRAM IS TRANSMITTED |
| 1 | THE PROGRAM IS TRANSMITTED |

MODULE PROCESSING CODE MANAGEMENT TABLE  770

FIG. 7B

PAYLOAD OF AN INSTALL REQUEST INTERNAL-PACKET CONTAINING PROGRAMS

PAYLOAD OF AN INSTALL REQUEST INTERNAL PACKET CONTAINING LOCATIONS OF PROGRAMS

PROGRAM INSTALL REQUEST PACKET

FORWARDING TABLE UPDATE REQUEST PACKET

| PROGRAM NAME (ref) STORAGE METHOD / MODULE KIND / PACKET SPECIFICATION CODE | 1.5.1 (4) 1 | 2.0.1 (3) 2 | 3.2.1 (1) 3 | 5.2.0 (1) 4 |
|---|---|---|---|---|
| PPPoE(1) | O | | | |
| WEB CACHE (2) | | O | | O |
| MPLS(3) | | | O | |
| FW(2) | O | | | |
| IPsec(5) | | O | | |
| IPsec(5) | | O | | |
| Ospf(6) | O | | | |
| Ospf(6) | O | | | |

MODULE-PROGRAM MANAGEMENT TABLE

FIG. 11A

REPRESENTATIVE ADDITION SEQUENCE OF THE FUNCTION ENHANCEMENT MODULE

PACKET PROCESS OF A CONVENTIONAL INFLEXIBLE TRANSFER APPARATUS

FUNCTION ENHANCEMENT MODULE DELETION PROCESS

FORWARDING TABLE UPDATE REQUEST PACKET

PROGRAM TRANSMISSION REQUEST PACKET

PROGRAM REQUEST PACKET

DISPLAY SCREEN OF THE OPERATOR CONTROL TERMINAL

1601   DISPLAY OF SERVICE NAMES

800   DISPLAY OF THE SETTING OF THE EXISTING NIFS

PROGRAM INSTALL REQUEST PACKET CONTAINING
A PLURALITY OF PIECES OF UPDATE INFORMATION

NIF ADDITION SEQUENCE

EVENT PROCESS BY A NOTIFYING PROGRAM

PACKET COMMUNICATION APPARATUS WITH FUNCTION ENHANCEMENT MODULE

CLAIM OF PRIORITY

The present application claims priority from Japanese application JP 2005-065492 filed on Mar. 9, 2005, the content of which is hereby incorporated by reference into this application.

FIELD OF THE INVENTION

The present invention relates to a packet communication apparatus for transferring packets on a network, and particularly to a technique for enhancing functions of the packet communication apparatus.

BACKGROUND OF THE INVENTION

A network for performing packet communications is configured by communication apparatuses, terminals, and links. The communication apparatuses relay packets. The terminals transmit and receive packets at the end of the network. The links connect the terminals with the communication apparatuses.

For example, the terminals transmit a packet to a destination terminal. Then, the packet communication apparatus relays the packet to the destination terminal, so that the destination terminal receives the packet.

The packet communication apparatus extracts the destination of the received packet, and then retrieves the next transferred address associated with the extracted destination, from a path table. Thereafter, the packet communication apparatus performs a process required for a relay on the packet, and then transmits the packet to the next transferred address that has been retrieved.

A packet communication apparatus applied with conventional technique executes the process required for a relay of packets by utilizing hardware. Therefore, in the case where the process required for a relay of packets is changed, it is necessary to exchange the whole packet communication apparatus. However, the exchange of the whole packet communication apparatus causes a problem in terms of cost. Further, it is difficult to immediately handle the exchange thereof.

There is known a packet processing apparatus that solves the problem (for example, JP 2003-258842 A and JP 2004-289223 A).

The packet processing apparatus disclosed in JP 2003-258842 A comprises the kind of packet and a table of processes associated with the kind of packet on a network interface (NIF) of the packet processing apparatus. Further, if a new enhancement unit (function enhancement module) is added to the packet processing apparatus, the network interface rewrites the table. Thereby, the network interface transfers a packet received from the outside to the function enhancement module.

In addition, the packet processing apparatus disclosed in JP 2004-289223 A comprises the same table as that in the packet processing apparatus disclosed in JP 2003-258842 A, in the network interface. Further, when the network interface receives a packet from the outside, the network interface gives a plurality of headers having a fixed length to the received packet. Thereby, the network interface allows the received packet to be transferred to a plurality of function enhancement modules.

However, the network interface performs only the process of transferring packets in the conventional packet processing apparatus. Further, the function enhancement module performs a sophisticated process as compared to the network interface.

For example, there is a problem in that in the case where the network interface transfers most of packets received from the outside to the function enhancement module, the function enhancement module becomes a bottleneck, so that the throughput of the whole packet processing apparatus is decreased.

In order to solve the problem, there is known a technique that pre-installs a program for reducing the processes of the function enhancement module into all the network interfaces.

In addition, there is a case that information necessary for the function enhancement module to process a packet is given to the packet by the network interface, and then the packet is transferred to the function enhancement module. Particularly, in the case where such information differs depending on the kind of the function enhancement module, a problem arises in that a manager has to update the setting of the network interface and software every time the function enhancement module is added.

SUMMARY OF THE INVENTION

In the packet processing apparatus which pre-installs a program for reducing the processes of the function enhancement module into all the network interfaces, the kind of applicable function enhancement module is limited. In addition, it is impossible for the packet processing apparatus to conform to the function enhancement module for executing a process that is newly required. Moreover, since the network interface of the packet processing apparatus stores unnecessary programs, the effectiveness of the memory resource has been poor.

In view of the foregoing, it is an object of the present invention to provide a packet communication apparatus for solving these problems.

According to one aspect of the present invention, a packet communication apparatus comprising a node management processor for controlling the apparatus, network interfaces for transmitting and receiving packets to and from external networks, function enhancement modules for performing predetermined processes on the packets, and a switch for transferring the packets within the apparatus, the function enhancement module stores the program stored in the memory, the network interface includes a CPU and a memory, the memory is installed a program stored in the function enhancement module executed by the CPU, and the CPU processes the packet received from the external networks by executing the program installed in the memory.

According to one aspect of the present invention, a new function enhancement module can be added to the packet communication apparatus of the present invention by updating a program for processing a packet on the network interface.

In addition, it is possible to lighten a management load imposed on the packet transfer apparatus by installing a program having a function other than that of processing a packet into the network interface.

BRIEF DESCRIPTION OF THE DRAWINGS

The present invention can be appreciated by the description which follows in conjunction with the following figures, wherein:

FIG. 4A is an explanatory diagram of internal addresses of units configuring the packet communication apparatus according to the embodiment of the present invention;

FIG. 4B is a configuration diagram of a forwarding table of the network interface according to the embodiment of the present invention;

FIG. 5A is a configuration diagram of a node management processor processing code management table according to the embodiment of the present invention;

FIG. 5B is a configuration diagram of a program obtaining code management table according to the embodiment of the present invention;

FIG. 5C is a configuration diagram of an NIF specification code management table according to the embodiment of the present invention;

FIG. 5D is a configuration diagram of a packet specification code management table according to the embodiment of the present invention;

FIG. 6A is a configuration diagram of an NIF-program management table according to the embodiment of the present invention;

FIG. 6B is a configuration diagram of an NIF processing code management table according to the embodiment of the present invention;

FIG. 6C is a configuration diagram of an update code management table according to the embodiment of the present invention;

FIG. 7A is a configuration diagram of a program specification code management table according to the embodiment of the present invention;

FIG. 7B is a configuration diagram of a module processing code management table according to the embodiment of the present invention;

FIG. 11A is a configuration diagram of a module-program management table according to the embodiment of the present invention;

DETAILED DESCRIPTION OF THE PREFERRED EMBODIMENT

Hereinafter, the embodiment of the present invention will be described with reference to the drawings.

Figure 1A:
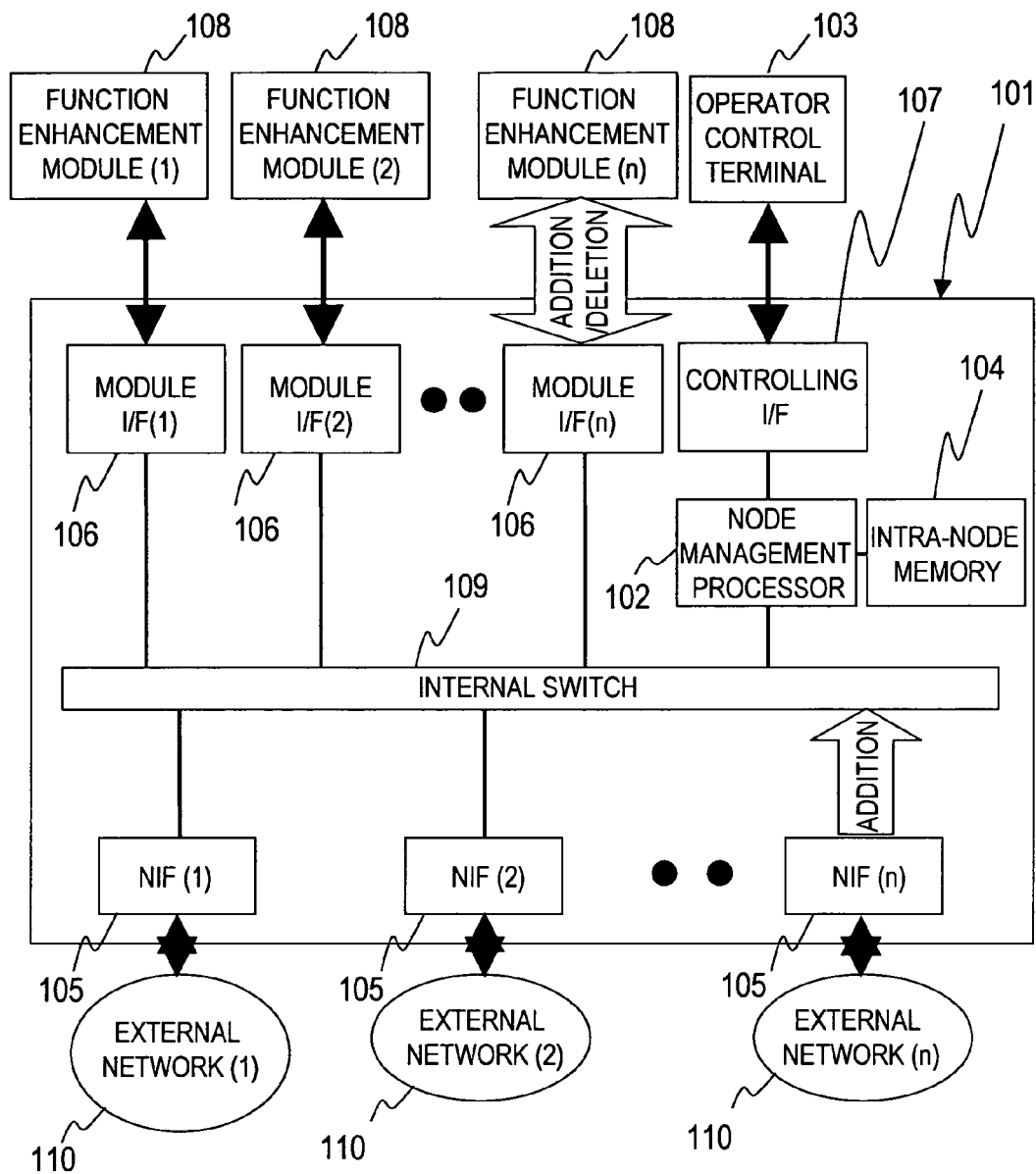
FIG. 1A is a block diagram of a packet communication apparatus according to the embodiment of the present invention.

FIG. 1A is a block diagram of a packet communication apparatus 101 according to the embodiment of the present invention.

The packet communication apparatus 101 comprises a node management processor 102, an operator control terminal 103, an intra-node memory 104, network interfaces (NIFs) 105, module interfaces 106, a controlling interface 107, function enhancement modules 108, and an internal switch 109.

Note that the number of the network interfaces 105, the module interfaces 106, and the function enhancement modules 108 is not limited.

The node management processor 102 manages the whole packet communication apparatus 101.

The operator control terminal 103 is a computing machine comprising a display unit (for example, a liquid crystal display or the like) and an input unit (for example, a key board or the like). An operator inputs an instruction for the packet communication apparatus 101 into the operator control terminal 103. The operator control terminal 103 transmits the inputted instruction to the node management processor 102.

The controlling interface 107 is an interface for connecting the node management processor 102 with the operator control terminal 103. Note that the controlling interface 107 may be connected with the node management processor 102 directly or through the internal switch 109.

The intra-node memory 104 is connected with the node management processor 102 and stores information to be used by the node management processor 102. Note that the intra-node memory 104 may be connected with the node management processor 102 directly or through the internal switch 109.

The network interfaces 105 transmit and receive packets to and from external networks 110. The network interface 105 can install a program without stopping a function of transmitting and receiving packets. As similar thereto, the network interface 105 can delete the installed program without stopping the function of transmitting and receiving packets. Further, the network interface 105 executes the installed program and accordingly performs predetermined processes on the received packets. The predetermined processes include an encapsulation process, an encryption process and/or a decryption process.

The external network 110 is a user network, an ISP (Internet service provider) network, an access network, and the like. The user network is a network with which a user is directly connected. The ISP network is a network with which an Internet server is directly connected. The Internet server is a computing machine for providing Internet service for the user. The access network is a network for connecting the user network with the ISP network.

The module interface 106 is an interface for connecting the internal switch 109 with the function enhancement module 108.

The module interface 106 and the controlling interface 107 may be interfaces having the same function as that of the network interface 105.

The function enhancement module 108 can be detachably mounted to the module interface 106. Further, when the function enhancement module 108 is mounted to the module interface 106, the function enhancement module 108 provides functions for the packet communication apparatus 101.

The internal switch 109 is connected with the units in the apparatus, such as the node management processor 102; the network interfaces 105, and the module interfaces 106. The internal switch 109 stores a forwarding table. The forwarding table represents the association between header information of a packet and a transferred address of a packet.

Specifically, the internal switch 109 receives a packet from the units connected therewith in the apparatus. Then, the internal switch 109 refers to the forwarding table and determines the transferred address of the received packet. Further, the internal switch 109 transfers the packet to the unit, which is determined as the transferred address, in the apparatus.

Figure 1B:
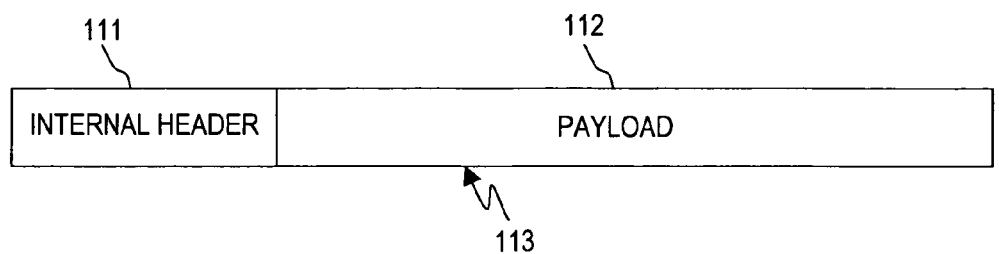
FIG. 1B is a configuration diagram of a packet within the packet communication apparatus according to the embodiment of the present invention.

FIG. 1B is a configuration diagram of a packet within the packet communication apparatus 101 according to the embodiment of the present invention.

An internal packet 113 within the packet communication apparatus 101 contains an internal header 111 and a payload 112.

Information such as an internal address that is available only within the packet communication apparatus 101 is stored in the internal header 111. The content of the packet is stored in the payload 112.

Figure 2:
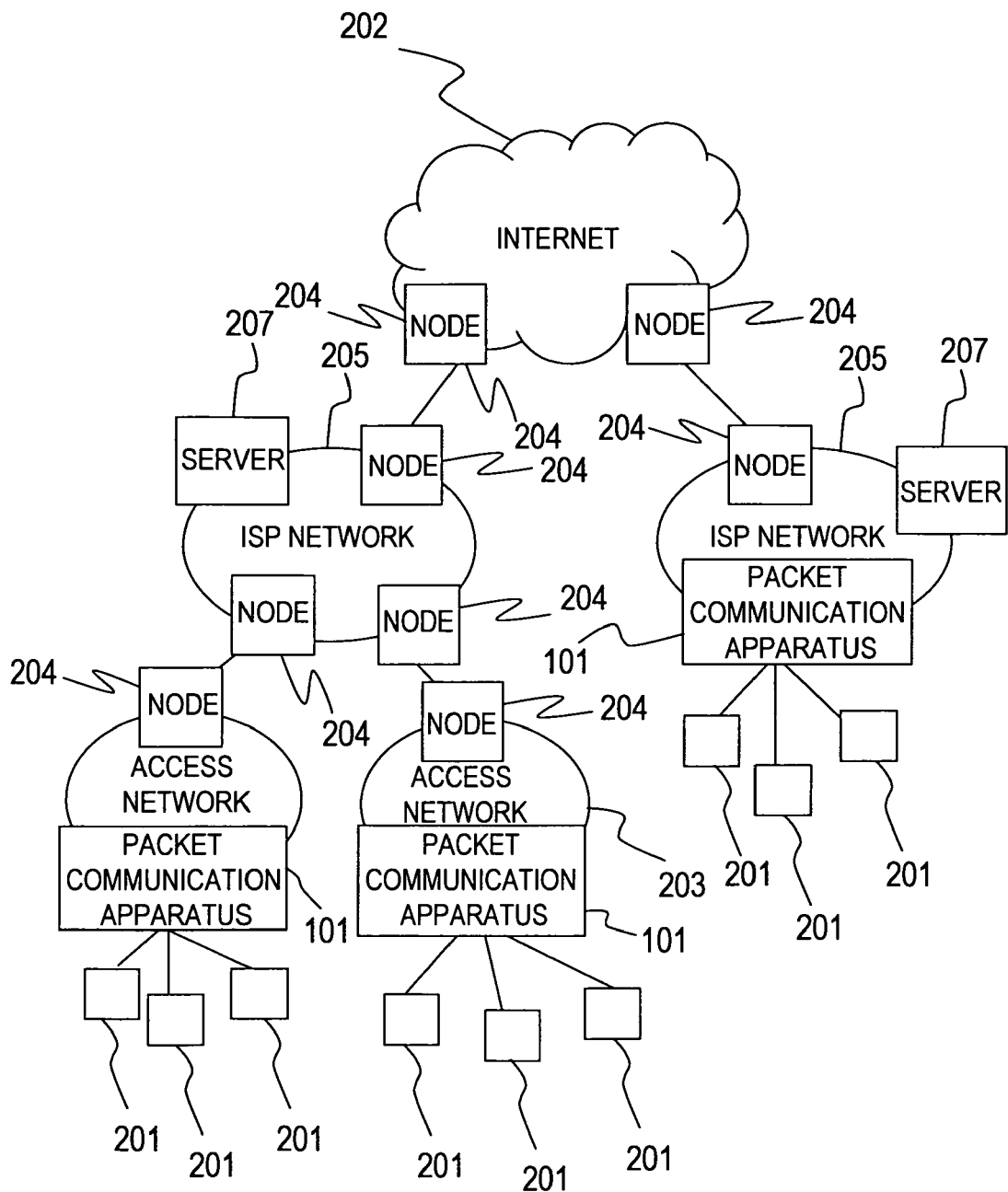
FIG. 2 is a block diagram of networks to which the packet communication apparatus according to the embodiment of the present invention is applied.

FIG. 2 is a block diagram of networks to which the packet communication apparatus 101 according to the embodiment of the present invention is applied.

FIG. 2 shows a typical configuration of networks through which user terminals 201 are connected with the Internet 202. The networks include the Internet 202, access networks 203, and ISP networks 205.

The user terminal 201 is a computing machine which is connected with the Internet 202 through the ISP network 205.

The Internet 202 is a network which includes a plurality of servers.

The ISP network 205 includes an Internet server 207 and nodes 204. The Internet server 207 provides Internet service for the user terminal 201. The node 204 transfers packets on the networks.

The access network 203 is a network for connecting the user terminal 201 with the ISP network 205. Further, the access network 203 includes the node 204.

Further, the packet communication apparatus 101 according to the embodiment can be applied to the node 204 included in the ISP network 205 and/or the node 204 included in the access network 203. In this case, the packet communication apparatus 101 connects the Internet server 207 with the user terminal 201 so as to transfer a packet. Further, the packet communication apparatus 101 performs predetermined processes on the packet to be transferred. The predetermined processes include, for example, a packet filtering process, an authentication process and/or an encryption process.

Figure 3A:
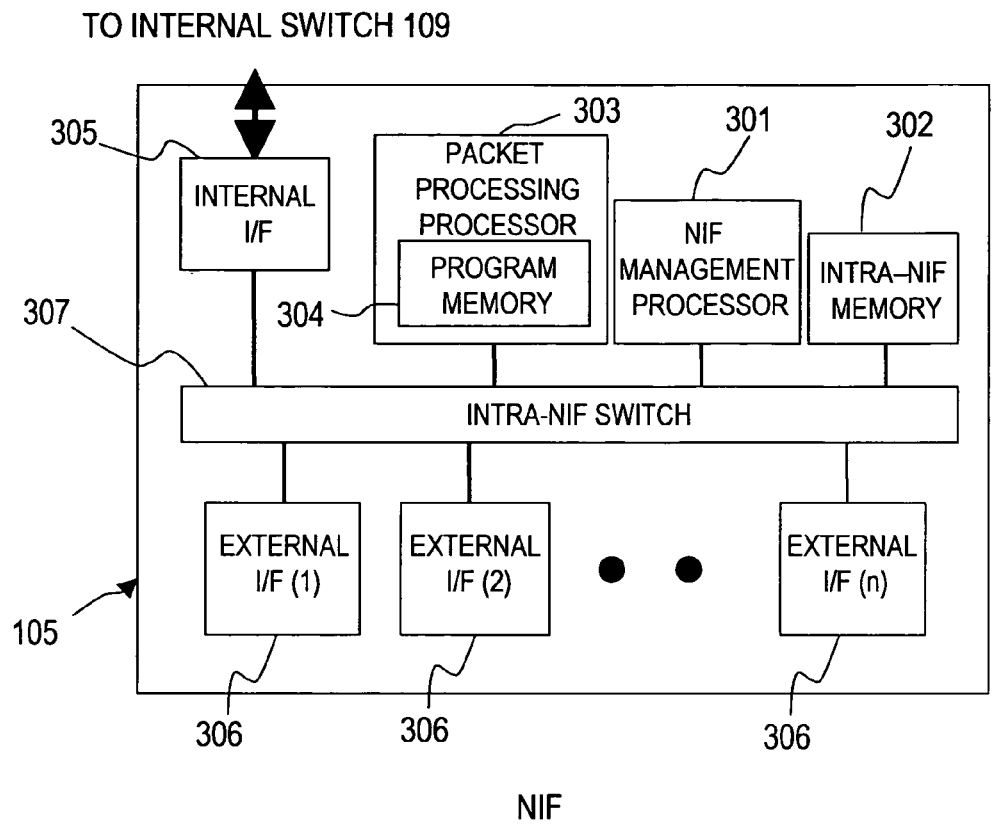
FIG. 3A is a block diagram of a network interface according to the embodiment of the present invention.

FIG. 3A is a block diagram of the network interface 105 according to the embodiment of the present invention.

The network interface 105 comprises an NIF management processor 301, an intra-NIF memory 302, a packet processing processor 303, an internal interface 305, external interfaces 306 and an intra-NIF switch 307.

The external interfaces 306 of n units are shown in the drawing. However, the number of the external interfaces 306 is not limited.

The intra-NIF switch 307 is connected with the NIF management processor 301, the intra-NIF memory 302, the packet processing processor 303, the internal interface 305, and the external interfaces 306.

The NIF management processor 301 controls the whole network interface 105.

The intra-NIF memory 302 stores information to be used by the NIF management processor 301. Further, the intra-NIF memory 302 temporarily stores a packet received from the internal interface 305 or the external interface 306.

Further, the intra-NIF memory 302 stores a forwarding table which will be described with reference to FIG. 4B. The forwarding table represents the association between header information of a packet and a transferred address of a packet. Moreover, the forwarding table stored in the intra-NIF memory 302 contains the content of a process performed on a packet by the packet processing processor 303.

The packet processing processor 303 includes a program memory 304. The program memory 304 stores programs for processing a packet. The programs stored in the program memory 304 perform, for example, an encapsulation process, an encryption process and/or a decryption process.

The programs stored in the program memory 304 are preferably produced according to the same standard, so that the program memory 304 can be used effectively.

The packet processing processor 303 executes the program stored in the program memory 304, and accordingly performs predetermined processes on a packet.

The content of the processes executed by the packet processing processor 303 can be changed by changing the program stored in the program memory 304.

Further, the program memory 304, instead of the intra-NIF memory 302, may store the forwarding table (shown in FIG. 4B).

The internal interface 305 is an interface for connecting the internal switch 109 with the intra-NIF switch 307.

The external interface 306 is an interface for connecting the external network 110 with the intra-NIF switch 307.

Here, the process performed by the network interface 105 which has received a packet from the external interface 306 will be described.

The external interface 306 receives a packet from the external network 110 being connected therewith, and then transmits the received packet to the intra-NIF memory 302 through the intra-NIF switch 307.

Then, the intra-NIF memory 302 stores the received packet.

Next, the packet processing processor 303 analyzes the content of the packet stored in the intra-NIF memory 302, and then performs a process associated with the analyzed content on the packet.

For example, the packet processing processor 303 analyzes the packet stored in the intra-NIF memory 302 as an IP packet. Then, the packet processing processor 303 refers to the forwarding table (FIG. 4B) stored in the intra-NIF memory 302, and determines the network interface 105 from which the packet is externally transferred.

Next, the packet processing processor 303 adds the internal address of the determined network interface 105 to the packet, and then transmits the packet with the internal address added, to the internal switch 109 through the intra-NIF switch 307 and the internal interface 305.

Figure 3B:
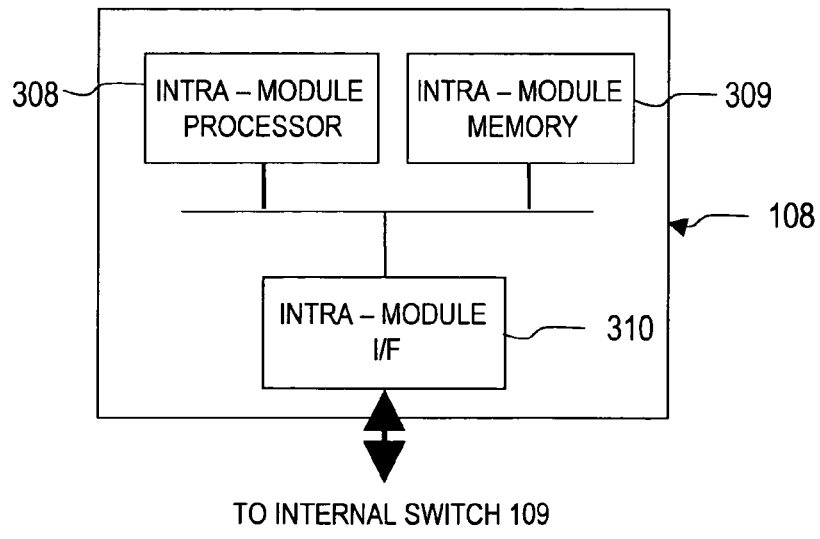
FIG. 3B is a block diagram of a function enhancement module according to the embodiment of the present invention.

FIG. 3B is a block diagram of the function enhancement module 108 according to the embodiment of the present invention.

The function enhancement module 108 comprises an intra-module processor 308, an intra-module memory 309, and an intra-module interface 310.

The intra-module interface 310 is an interface for transmitting and receiving a packet to and from the internal switch 109.

The intra-module memory 309 stores information (including a program) to be used by the intra-module processor 308. Further, the intra-module memory 309 stores a program to be installed to the network interface 105.

The intra-module processor 308 executes the program stored in the intra-module memory 309, and accordingly processes the packet received from the intra-module interface 310. Further, the intra-module processor 308 manages the whole function enhancement module 108.

FIG. 4A is an explanatory diagram of the internal addresses of the units configuring the packet communication apparatus 101 according to the embodiment of the present invention.

The respective units in the apparatus are given "1, 2, . . ." as the internal addresses in the embodiment.

Specifically, the internal address of the node management processor 102 is "1". The internal address of the internal switch 109 is "2". The internal addresses of the network interface (1) 105 and the network interface (2) 105 are "3" and "4", respectively. The internal addresses of the module interface (1) 106 and the module interface (2) 106 are "7" and "8", respectively. The internal addresses of the function enhancement module (1) 108 and the function enhancement module (2) 108 are "11" and "12", respectively.

FIG. 4B is a configuration diagram of a forwarding table 401 of the network interface (1) 105 according to the embodiment of the present invention.

The forwarding table 401 contains header information 402 and process content 403.

The header information 402 contains a destination internal-address 404, a payload type 405, and an IP address/prefix length 406.

The destination internal-address 404 is the internal address of the unit to which the packet is transferred next in the apparatus. The payload type 405 is the header information in Ethernet, and is the kind of information stored in the payload. An IP address to which the packet is transmitted is stored in the IP address/prefix length 406. Further, the length of a network address part of the IP address (prefix length) is stored in the IP address/prefix length 406.

The process content 403 is the content of processes performed on the packet corresponding to the record by the network interface (1) 105. The transferred address of the packet and the name of a program for processing the packet are stored in the process content 403.

The network interface (1) 105 receives a packet from the internal interface 305 or the external interface 306, and then extracts the header from the received packet. Then, the network interface (1) 105 selects a record, in which the extracted header matches the header information 402 in the forwarding table 401, from the forwarding table 401, and then extracts the process content 403 from the selected record.

Next, the network interface (1) 105 performs the program having the program name stored in the extracted process content 403, and accordingly processes the packet. Then, the network interface (1) 105 transmits the processed packet to the transferred address that is stored in the extracted process content 403.

FIG. 5A is a configuration diagram of a node management processor processing code management table 700 according to the embodiment of the present invention.

The node management processor processing code management table 700 is stored in the intra-node memory 104, the intra-NIF memory 302 of the network interface 105, and the intra-module memory 309 of the function enhancement module 108.

The node management processor processing code management table 700 contains a node management processor processing code 701 and process content 702.

The node management processor processing code 701 is the unique identifier of the process content 702. The process content 702 is the content of processes that the node management processor 102 is requested to perform.

FIG. 5B is a configuration diagram of a program obtaining code management table 710 according to the embodiment of the present invention.

The program obtaining code management table 710 is stored in the intra-node memory 104, the intra-NIF memory 302 of the network interface 105, and the intra-module memory 309 of the function enhancement module 108.

The program obtaining code management table 710 contains a program obtaining code 711 and an obtaining method 712.

The program obtaining code 711 is the unique identifier of the obtaining method 712.

The obtaining method 712 is a method in which the node management processor 102 obtains a program.

FIG. 5C is a configuration diagram of an NIF specification code management table 720 according to the embodiment of the present invention.

The NIF specification code management table 720 is stored in the intra-node memory 104 and the intra-module memory 309 of the function enhancement module 108.

The NIF specification code management table 720 contains an NIF specification code 721 and a destination 722.

The NIF specification code 721 is the unique identifier of the destination 722. The destination 722 represents the network interface 105 to which a program is transmitted.

FIG. 5D is a configuration diagram of a packet specification code management table 730 according to the embodiment of the present invention.

The packet specification code management table 730 is stored in the intra-node memory 104, the intra-NIF memory 302 of the network interface 105, and the intra-module memory 309 of the function enhancement module 108.

The packet specification code management table 730 contains a packet specification code 731 and a packet kind 732.

The packet specification code 731 is the unique identifier of the packet kind 732. The packet kind 732 is a kind determined by using the header of a packet and the like, and is, for example, a payload type, an IP address, and the like.

FIG. 6A is a configuration diagram of an NIF-program management table 800 according to the embodiment of the present invention.

The NIF-program management table 800 is stored in the intra-node memory 104 and the intra-NIF memory 302 of the network interface 105.

The NIF-program management table 800 represents the association between the network interfaces 105 and programs.

An NIF number 802 is the unique identifier of the network interface 105. A program name 801 is the unique identifier of a program.

When the program having the program name 801 is installed in the network interface 105 corresponding to the NIF number 802, a round mark is stored in the corresponding box in the NIF-program management table 800.

Further, the NIF-program management table 800 contains a reference counter (ref) 803 and a memory remaining ratio (rem) 804.

The reference counter 803 indicates the number of the function enhancement modules 108 that are using the program.

The memory remaining ratio 804 is the ratio of an unused area in the program memory 304 of the network interface 105.

The NIF-program management table 800 may have information such as the association between the function enhancement modules 108 and programs and the association between the network interfaces 105 and the function enhancement modules 108.

FIG. 6B is a configuration diagram of an NIF processing code management table 740 according to the embodiment of the present invention.

The NIF processing code management table 740 is stored in the intra-node memory 104 and the intra-NIF memory 302 of the network interface 105.

The NIF processing code management table 740 contains an NIF processing code 741 and NIF processing content 742.

The NIF processing code 741 is the unique identifier of the NIF processing content 742. The NIF processing content 742 is the content of processes performed by the network interface 105.

FIG. 6C is a configuration diagram of an update code management table 750 according to the embodiment of the present invention.

The update code management table 750 is stored in the intra-node memory 104 and the intra-NIF memory 302 of the network interface 105.

The update code management table 750 contains an update code 751 and NIF updating content 752.

The update code 751 is the unique identifier of the NIF updating content 752. The NIF updating content 752 is the content with which the network interface 105 updates the forwarding table 401.

FIG. 7A is a configuration diagram of a program specification code management table 760 according to the embodiment of the present invention.

The program specification code management table 760 is stored in the intra-node memory 104 and the intra-NIF memory 302 of the network interface 105.

The program specification code management table 760 contains a program specification code 761 and a transmission program 762.

The program specification code 761 is the unique identifier of the transmission program 762. The transmission program 762 represents a program which is to be installed to the network interface 105.

FIG. 7B is a configuration diagram of a module processing code management table 770 according to the embodiment of the present invention.

The module processing code management table 770 is stored in the intra-node memory 104 and the intra-module memory 309 of the function enhancement module 108.

The module processing code management table 770 contains a module processing code 771 and module processing content 772.

The module processing code 771 is the unique identifier of the module processing content 772. The module processing content 772 is the content of processes that the function enhancement module 108 is requested to perform.

Figure 8:
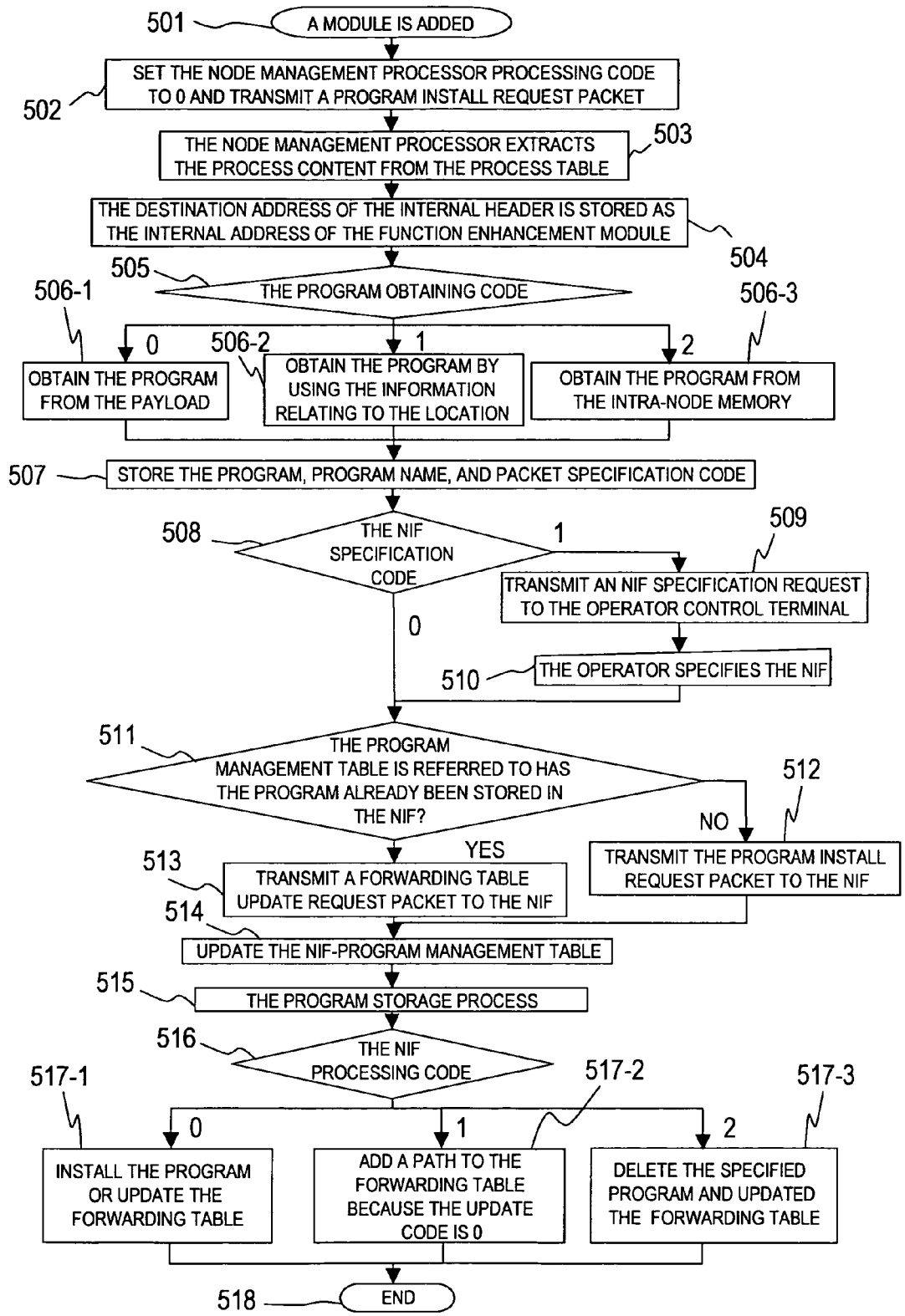
FIG. 8 is a flow chart of a function enhancement module addition process of the packet communication apparatus according to the embodiment of the present invention.

FIG. 8 is a flow chart of a function enhancement module addition process in the packet communication apparatus 101 according to the embodiment of the present invention.

The function enhancement module 108 is connected with the module interface 106. Then, the packet communication apparatus 101 starts the addition process for the function enhancement module 108 (501).

Specifically, the function enhancement module 108 detects the fact that the intra-module interface 310 of the function enhancement module 108 is connected with the module interface 106 of the packet communication apparatus 101. When the function enhancement module 108 detects the connection, the function enhancement module 108 transmits an install request internal packet to the node management processor 102 (502).

The install request internal packet is a packet for requesting the network interface 105 to install a program, and is configured by the internal header 111 and the payload 112.

Figure 9A:
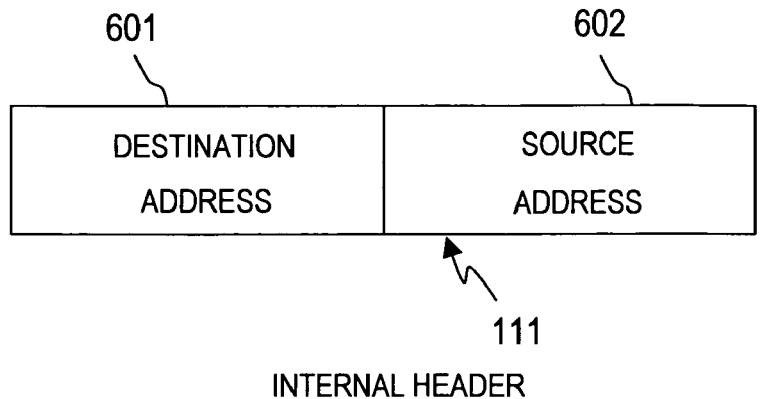
FIG. 9A is a configuration diagram of an internal header according to the embodiment of the present invention.

FIG. 9A is a configuration diagram of the internal header 111 according to the embodiment of the present invention.

The internal header 111 contains a destination address 601 and a source address 602.

The destination address 601 is the internal address of the unit which receives the packet in the apparatus. The source address 602 is the internal address of the unit which transmits the packet in the apparatus.

The destination address 601 is the internal address of the node management processor 102 in the install request internal packet. Further, the source address 602 is the internal address of the function enhancement module 108 in the install request internal packet. It is necessary to set a multicast address in advance in the packet communication apparatus 101 where the function enhancement module 108 is unable to know the internal address of the node management processor 102. Accordingly, the multicast address is set as the destination address 601 in the install request internal packet. The packet having the multicast address as the destination address is transmitted to all the units in the apparatus.

However, when the other units in the apparatus than the node management processor 102 receive the internal packet having the multicast address as the destination address 601, the units discard the received internal packet. Alternatively, when the internal switch 109 receives the internal packet having the multicast address as the destination address 601, the internal switch 109 transfers the received internal packet only to the node management processor 102. Thereby, only the node management processor 102 receives the install request internal packet.

Figure 9B:
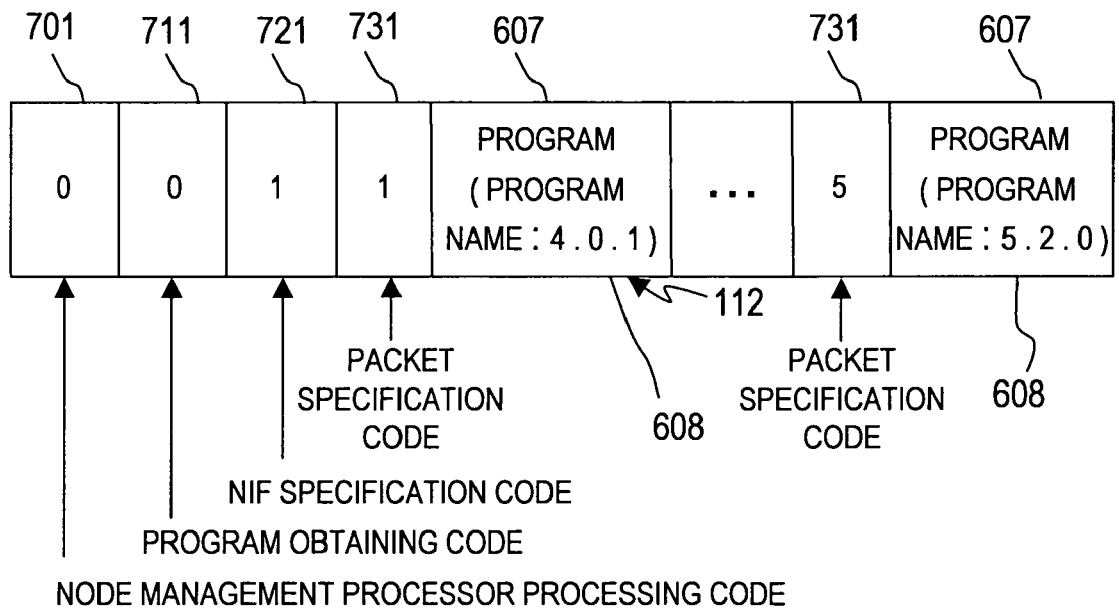
FIG. 9B is a configuration diagram of a payload of an install request internal packet containing a program according to the embodiment of the present invention.

FIG. 9B is a configuration diagram of the payload 112 of the install request internal packet including a program according to the embodiment of the present invention.

The payload 112 of the install request internal packet in FIG. 9B contains a program 607. Further, the payload 112 contains the node management processor processing code 701, the program obtaining code 711, the NIF specification code 721, and the packet specification code 731.

The function enhancement module 108 produces the payload 112 of the install request internal packet in the following manner.

First, the function enhancement module 108 selects a record, in which the content of a process that the node management processor 102 is requested to perform matches the process content 702 in the node management processor processing code management table 700, from the node management processor processing code management table 700. Next, the node management processor processing code 701 is extracted from the selected record. Then, the extracted node management processor processing code 701 is stored in the payload 112 of the packet.

The install request internal packet requests the node management processor 102 to add the function enhancement module 108. Therefore, the function enhancement module 108 stores "0" as the node management processor processing code 701 in the payload 112 of the packet.

Next, the function enhancement module 108 selects a record, in which a program obtaining method performed by the node management processor 102 matches the obtaining method 712 in the program obtaining code management table 710, from the program obtaining code management table 710. Then, the program obtaining code 711 is extracted from the selected record. Then, the extracted program obtaining code 711 is stored in the payload 112 of the packet.

The payload in FIG. 9B contains the program 607. The function enhancement module 108 accordingly stores "0" as the program obtaining code 711 in the payload 112 of the packet.

Next, the function enhancement module 108 selects a record, in which the network interface 105 for installing the program matches the destination 722 of the NIF specification code management table 720, from the NIF specification code management table 720. Then, the NIF specification code 721 is extracted from the selected record. Then, the extracted NIF specification code 721 is stored in the payload 112 of the packet.

The install request internal packet in FIG. 9B is for the case where the operator is made to select the network interface 105 for installing the program. Accordingly, the function enhancement module 108 stores "1" as the NIF specification code 721 in the payload 112 of the packet.

Next, the function enhancement module 108 stores the program 607, which is to be installed to the network interface 105, in the payload 112 of the packet. The program 607 contains a program name 608.

The program name 608 is the unique identifier of a program. The program name 608 preferably represents the version and characteristics of a program. Accordingly, the operator control terminal 103 displays the program name 608 so that the operator can recognize the kind of program.

Next, the function enhancement module 108 selects a record, in which the kind of packet with which the network interface 105 executes the program 607 matches the packet kind 732 in the packet specification code management table 730, from the packet specification code management table 730. Then, the packet specification code 731 is extracted from the selected record. Then, the extracted packet specification code 731 is stored in the payload 112 of the packet.

Note that the install request internal packet may contain a plurality of the programs 607. In this case, the install request internal packet contains the packet specification code 731 associated with each of the programs 607.

For example, the packet specification code 731 associated with the program 607 having the program name 608 of "4.0.1" is "1".

Figure 9C:
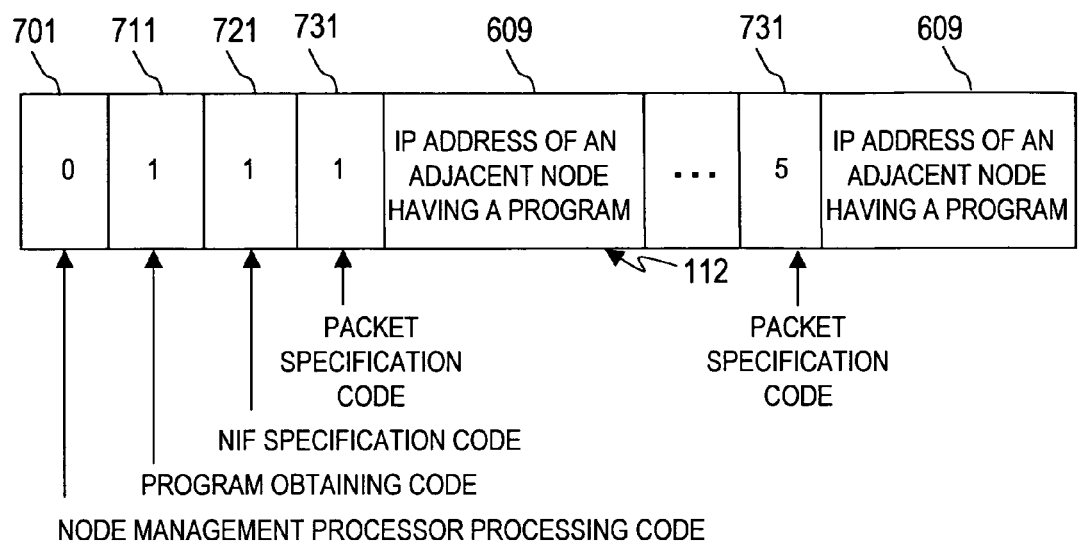
FIG. 9C is a configuration diagram of the payload of the install request internal packet containing the location of a program according to the embodiment of the present invention.

FIG. 9C is a configuration diagram of the payload 112 of the install request internal packet containing the location information of a program according to the embodiment of the present invention.

The payload 112 of the install request internal packet in FIG. 9C contains location information 609 of a program. The other configuration than that is identical to that of the payload (refer to FIG. 9B) of the install request internal packet containing a program. The identical numerals are given to the identical elements, so that the explanation thereof is omitted.

The location information 609 of a program is information with regard to the location of a program to be installed to the network interface 105. The location information 609 of a program indicates, for example, the URL of a server that stores the program, the IP address of a node that stores the program, and the like.

Note that the payload in FIG. 9C contains the location information 609 of a program instead of the program 607. Accordingly, the function enhancement module 108 stores "1" as the program obtaining code 711 in the payload 112 of the packet.

Here, the explanation will be made with reference to FIG. 8 again. The node management processor 102 receives the install request internal packet from the function enhancement module 108.

Next, the node management processor 102 extracts the node management processor processing code from the received install request internal packet, and then selects a record, in which the extracted node management processor processing code matches the node management processor processing code 701 in the node management processor processing code management table 700, from the node management processor processing code management table 700. Then, the node management processor 102 extracts the process content 702 from the selected record (503).

Then, the node management processor 102 performs a process associated with the extracted process content 702. In this case, the node management processor 102 performs the function enhancement module addition process because the node management processor processing code 701 is "0".

Specifically, the node management processor 102 extracts the destination address 601 from the internal header 111 of the received install request internal packet, and then stores the extracted destination address 601 in the intra-node memory 104 as the internal address of the function enhancement module 108 that is newly added (504).

However, in the case where the internal address is not the address (for example, a MAC address of Ethernet) that is allocated and fixed to each of units, the node management processor 102 does not store the extracted destination address 601 as the internal address. In this case, the node management processor 102 allocates an available internal address to the function enhancement module 108. Next, the node management processor 102 stores the allocated internal address in the intra-node memory 104, and then sets the allocated internal address for the internal switch 109 as the internal address of the function enhancement module 108.

Next, the node management processor 102 extracts the program obtaining code from the received install request internal packet (505). Then, the node management processor 102 selects a record, in which the extracted program obtaining code matches the program obtaining code 711 in the program obtaining code management table 710, from the program obtaining code management table 710. Then, the node management processor 102 extracts the obtaining method 712 from the selected record, and obtains the program by performing a process associated with the extracted obtaining method 712.

Specifically, the node management processor 102 determines that the program 607 is stored in the payload 112 of the install request internal packet if the extracted program obtaining code 711 is "0". Therefore, the node management processor 102 obtains the program 607 and the program name 608 from the payload 112 of the install request internal packet (506-1).

Further, the node management processor 102 determines that the location information 609 of a program is stored in the payload 112 of the install request internal packet if the extracted program obtaining code 711 is "1". Therefore, the node management processor 102 obtains the program and the program name on the basis of the location information 609 of the program stored in the payload 112 (506-2).

Further, the node management processor 102 determines that the program name is stored in the payload 112 of the install request internal packet if the extracted program obtaining code 711 is "2". Therefore, the node management processor 102 retrieves information with regard to the program name stored in the payload 112 from the intra-node memory 104. Then, if the program having the program name is stored in the intra-node memory 104, the node management processor 102 obtains the program from the intra-node memory 104 (506-3).

On the other hand, if the location information of the program having the program name is stored in the intra-node memory 104, the node management processor 102 obtains the location information from the intra-node memory 104 and then obtains the program on the basis of the obtained location information (506-3).

Next, the node management processor 102 extracts the packet specification code 731 from the payload 112 of the received install request internal packet, and then stores the obtained program, the obtained program name, and the extracted packet specification code 731 in the intra-node memory 104 (507).

Next, the node management processor 102 extracts the NIF specification code from the payload 112 of the received install request internal packet (508).

Next, the node management processor 102 selects a record, in which the extracted NIF specification code matches the NIF specification code 721 in the NIF specification code management table 720, from the NIF specification code management table 720. Then, the node management processor 102 extracts the destination 722 from the selected record, and then transmits the program to the network interface 105 of the extracted destination 722.

Specifically, the node management processor 102 determines that all the network interfaces 105 are the destinations for the program if the extracted NIF specification code 721 is "0". Therefore, the flow proceeds to Step 511 without performing any other processes.

On the other hand, the node management processor 102 determines that the network interface 105 for installing the program is specified by the operator if the extracted NIF specification code 721 is "1". Then, the node management processor 102 transmits an NIF specification request to the operator control terminal 103 (509). The NIF specification request contains the program name that has been stored in the intra-node memory 104 in Step 507.

Then, the operator control terminal 103 displays information associated with the received NIF specification request on a display unit.

Figure 10A:
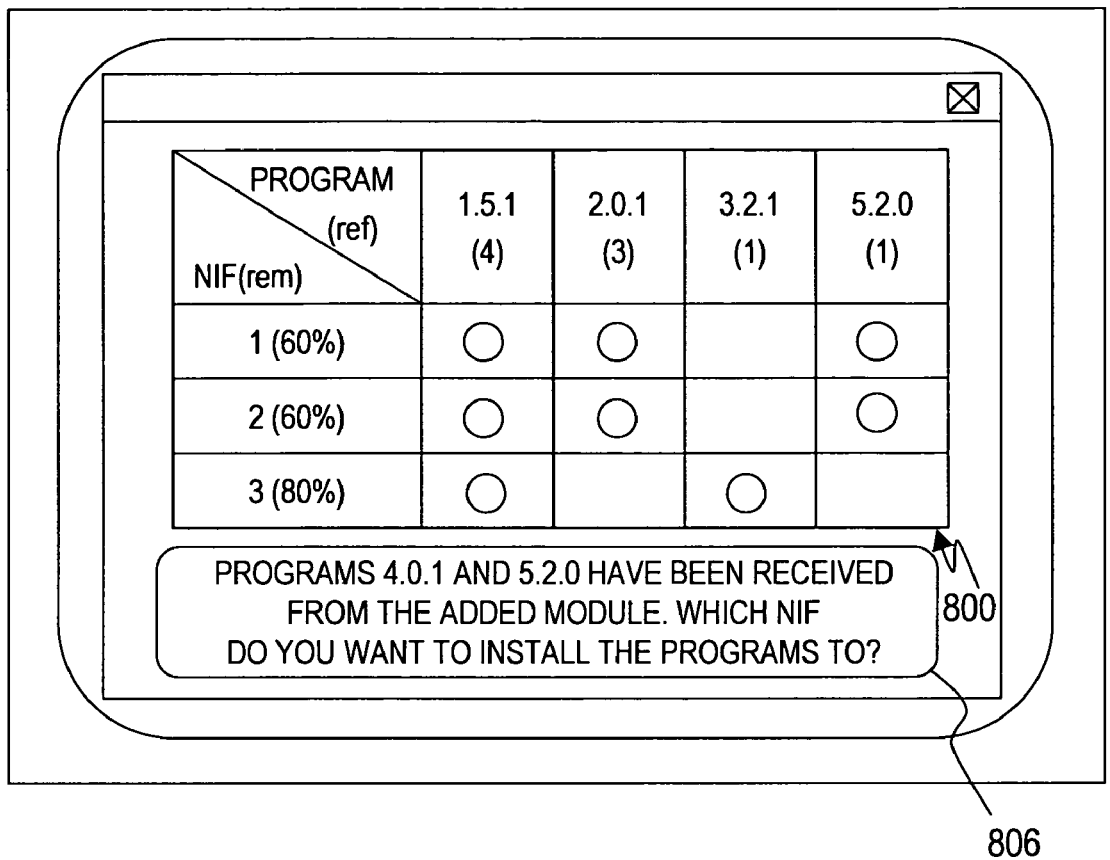
FIG. 10A is an explanatory diagram of a display screen of an operator control terminal, which has received an NIF specification request, according to the embodiment of the present invention.

FIG. 10A is an explanatory diagram of a display screen of the operator control terminal 103, which has received the NIF specification request, according to the embodiment of the present invention.

The operator control terminal 103 displays the NIF-program management table 800 (FIG. 6A), a message 806, and the like.

Specifically, the operator control terminal 103 extracts the program name from the received NIF specification request, and then displays the message 806 for requesting the operator to specify the network interface 105 for installing the program having the extracted program name.

Further, the operator control terminal 103 obtains the NIF-program management table 800 from the intra-node memory 104, and then displays the obtained NIF-program management table 800.

The operator can visually recognize a status, in which the programs are being installed to the network interfaces 105, by confirming the display screen of the operator control terminal 103.

Here, the explanation will be made with reference to FIG. 8 again.

The operator specifies the network interface 105 for installing the program on the operator control terminal 103 (510).

The operator control terminal 103 notifies the node management processor 102 of the network interface 105 specified by the operator. Then, the node management processor 102 determines the notified network interface 105 as the destination for the program.

Next, the node management processor 102 determines whether or not the program has already been installed to the network interface 105 determined as the destination by referring to the NIF-program management table 800 (511).

Specifically, the node management processor 102 extracts a block in which the name of the program to be installed matches the program name 801 in the NIF-program management table 800 and, further, the NIF number of the network interface 105 determined as the destination matches the NIF number 802 in the NIF-program management table 800.

Then, the node management processor 102 determines that the program has already been installed if a round mark is stored in the extracted block. On the other hand, the node management processor 102 determines that the program has not been installed if the extracted block is blank.

The node management processor 102 transmits a program install request packet to the network interface 105 determined as the destination if it is determined that the program has not been installed (512).

Figure 10B:
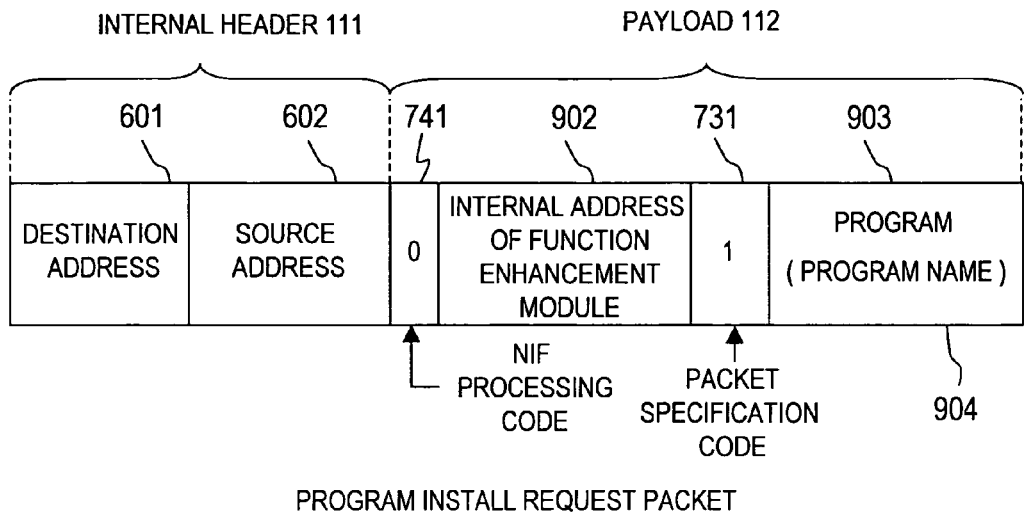
FIG. 10B is a configuration diagram of a program install request packet according to the embodiment of the present invention.

FIG. 10B is a configuration diagram of the program install request packet according to the embodiment of the present invention.

The program install request packet is configured by the internal header 111 and the payload 112.

The internal header 111 contains the destination address 601 and the source address 602.

The destination address 601 is the internal address of the unit which receives the packet in the apparatus. The source address 602 is the internal address of the unit which transmits the packet in the apparatus.

The destination address 601 is the internal address of the network interface 105 as the destination for the packet in the program install request packet. Further, the source address 602 is the internal address of the node management processor 102 in the program install request packet.

The payload 112 contains the NIF processing code 741, an internal address 902 of the function enhancement module, the packet specification code 731, a program 903, and a program name 904.

Note that the payload 112 may contain a plurality of the programs 903. In this case, the payload 112 contains the packet specification code 731 and the program name 904 associated with each of the programs 903.

The node management processor 102 produces the payload 112 of the program install request packet in the following manner.

First, the node management processor 102 selects a record, in which the content of a process that the network interface 105 is requested to perform matches the NIF processing content 742 in the NIF processing code management table 740, from the NIF processing code management table 740. Next, the NIF processing code 741 is extracted from the selected record. Then, the extracted NIF processing code 741 is stored in the payload 112 of the packet.

The program install request packet requests the network interface 105 to install the program 903 stored in the payload. Accordingly, the node management processor 102 stores "0" as the NIF processing code 741 in the payload 112 of the packet.

Next, the node management processor 102 extracts the internal address which has been stored in the intra-node memory 104 in Step 504, and then stores the extracted internal address in the payload 112 of the packet as the internal address 902 of the function enhancement module which has been added to the packet communication apparatus 101.

Next, the node management processor 102 extracts the packet specification code 731, the program, and the program name which have been stored in the intra-node memory 104 in Step 507. Then, the extracted packet specification code 731, program, and program name are stored in the payload 112 of the packet.

Here, the explanation will be made with reference to FIG. 8 again.

On the other hand, if the node management processor 102 determines in Step 511 that the program has already been installed, it is not necessary to transmit the program to the network interface 105. Accordingly, the node management processor 102 transmits a forwarding table update request packet to the network interface 105 determined as the destination (513).

Figure 10C:
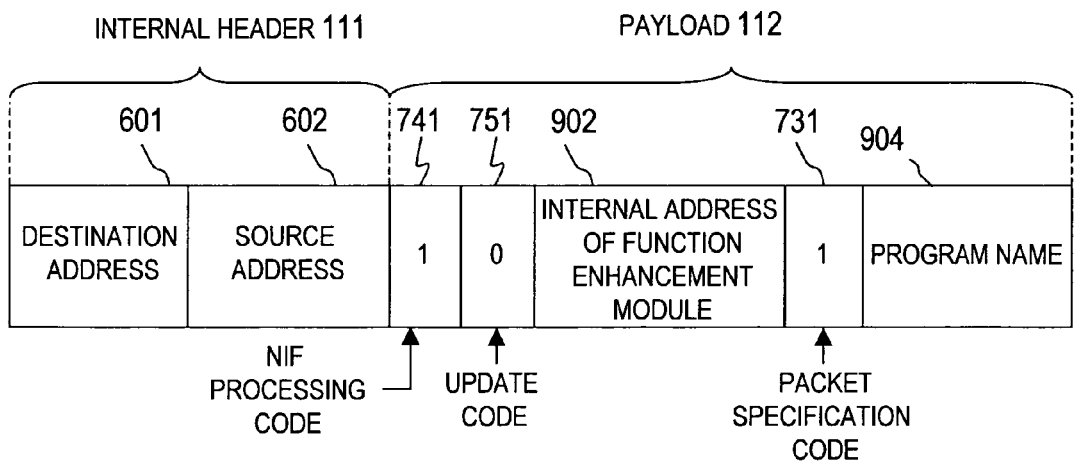
FIG. 10C is a configuration diagram of a forwarding table update request packet according to the embodiment of the present invention.

FIG. 10C is a configuration diagram of the forwarding table update request packet according to the embodiment of the present invention.

The forwarding table update request packet is configured by the internal header 111 and the payload 112.

The internal header 111 contains the destination address 601 and the source address 602.

The destination address 601 is the internal address of the unit which receives the packet in the apparatus. The source address 602 is the internal address of the unit which transmits the packet in the apparatus.

The destination address 601 is the internal address of the network interface 105 as the destination for the packet in the forwarding table update request packet. Further, the source address 602 is the internal address of the node management processor 102 in the forwarding table update request packet.

The payload 112 contains the NIF processing code 741, the update code 751, the internal address 902, the packet specification code 731, and the program name 904.

Note that the payload 112 may contain a plurality of program names 904. In this case, the payload 112 contains the packet specification code 731 associated with each of the program names 904.

The node management processor 102 produces the payload 112 of the forwarding table update request packet in the following manner.

First, the node management processor 102 selects a record, in which the content of a process that the network interface 105 is requested to perform matches the NIF processing content 742 in the NIF processing code management table 740, from the NIF processing code management table 740. Next, the NIF processing code 741 is extracted from the selected record. Then, the extracted NIF processing code 741 is stored in the payload 112 of the packet.

The forwarding table update request packet requests the network interface 105 to update the forwarding table. Accordingly, the node management processor 102 stores "1" as the NIF processing code 741 in the payload 112 of the packet.

Next, the node management processor 102 selects a record, in which the content of the forwarding table that the network interface 105 is requested to update matches the NIF updating content 752 in the update code management table 750, from the update code management table 750. Next, the update code 751 is extracted from the selected record. Then, the extracted update code 751 is stored in the payload 112 of the packet.

The forwarding table update request packet in FIG. 10C is transmitted in the process of adding the function enhancement module 108 to the packet communication apparatus 101. In this case, a path is added to the forwarding table 401.

Accordingly, the node management processor 102 stores "0" as the update code 751 in the payload 112 of the packet.

Next, the node management processor 102 extracts the internal address which has been stored in the intra-node memory 104 in Step 504, and then stores the extracted internal address in the payload 112 of the packet as the internal address 902 of the function enhancement module which has been added to the packet communication apparatus 101.

Next, the node management processor 102 extracts the packet specification code 731 and the program name which have been stored in the intra-node memory 104 in Step 507. Then, the extracted packet specification code 731 and program name are stored in the payload 112 of the packet.

Here, the explanation will be made with reference to FIG. 8 again. When the node management processor 102 transmits the program install request packet or the forwarding table update request packet to the network interface 105, the node management processor 102 updates the NIF-program management table 800 (514).

Specifically, the node management processor 102 stores a round mark in a box in which the program name 904 stored in the packet (the program install request packet or the forwarding table update request packet) matches the program name 801 in the NIF-program management table 800, and further, the NIF number of the network interface 105 as the destination of the packet matches the NIF number 802 in the NIF-program management table 800.

Next, the node management processor 102 selects the reference counter 803 of the record in which the program name 904 stored in the packet matches the program name 801 in the NIF-program management table 800. Then, the selected reference counter 803 is incremented.

Next, the node management processor 102 measures the data amount of the program 903 stored in the program install request packet. Then, the node management processor 102 selects the memory remaining ratio 804 of a record in which the NIF number of the network interface 105 as the destination of the packet matches the NIF number 802 in the NIF-program management table 800. Then, the memory remaining ratio is changed on the basis of the measured data amount.

Next, the node management processor 102 performs a program storage process (515). Note that the program storage process will be described in detail with reference to FIG. 11B.

On the other hand, the network interface 105 receives the packet from the node management processor 102. Then, the network interface 105 extracts the NIF processing code from the payload 112 of the received packet (516).

Next, the network interface 105 selects a record, in which the extracted NIF processing code matches the NIF processing code 741 in the NIF processing code management table 740, from the NIF processing code management table 740. Then, the network interface 105 extracts the NIF processing content 742 from the selected record, and performs a process associated with the extracted NIF processing content 742.

Specifically, the network interface 105 determines that the received packet is the program install request packet if the extracted NIF processing code 741 is "0". Accordingly, the network interface 105 extracts the program 903 from the payload 112 of the received packet, and then installs the extracted program 903.

Next, the network interface 105 updates the forwarding table 401 (517-1).

Specifically, the network interface 105 extracts the packet specification code 731 from the payload 112 of the received packet, and then selects a record, in which the extracted packet specification code matches the packet specification code 731 in the packet specification code management table 730, from the packet specification code management table 730. Then, the packet kind 732 is extracted from the selected record.

Next, the network interface 105 adds a new record to the forwarding table 401, and then stores the extracted packet kind 732 in the payload type 405 and the IP address/prefix length 406 for the new record.

Next, the network interface 105 extracts the internal address 902 of the function enhancement module and the program name 904 from the payload 112 of the received packet, and then stores the internal address 902 of the function enhancement module and the program name 904, which have been extracted, in the process content 403 of the newly added record.

As described above, the network interface 105 updates the forwarding table 401. Then, the packet communication apparatus 101 terminates the addition process of the function enhancement module 108 (518).

Further, the network interface 105 determines the received packet is the forwarding table update request packet if the extracted NIF processing code 741 is "1". Therefore, the network interface 105 updates the forwarding table 401 (517-2).

Specifically, the network interface 105 extracts the update code from the received packet. Next, the network interface 105 selects a record, in which the extracted update code matches the update code 751 in the update code management table 750, from the update code management table 750. Then, the NIF updating content 752 is extracted from the selected record.

Then, the network interface 105 determines the content of the forwarding table 401 that the network interface 105 updates, on the basis of the extracted NIF updating content 752.

In this case, since the extracted update code 751 is "0", the network interface 105 adds a path to the forwarding table 401. Accordingly, the network interface 105 extracts the packet specification code 731 from the payload 112 of the received packet. Next, the network interface 105 selects a record, in which the extracted packet specification code matches the packet specification code 731 in the packet specification code management table 730, from the packet specification code management table 730. Then, the network interface 105 extracts the packet kind 732 from the selected record.

Next, the network interface 105 adds a new record to the forwarding table 401. Then, the network interface 105 stores the extracted packet kind 732 in the payload type 405 and the IP address/prefix length 406 of the new record.

Next, the network interface 105 extracts the internal address 902 of the function enhancement module and the program name 904 from the payload 112 of the received packet, and then stores the internal address 902 of the function enhancement module and the program name 904, which have been extracted, in the process content 403 of the newly added record.

As described above, the network interface 105 updates the forwarding table 401. Then, the packet communication apparatus 101 terminates the addition process of the function enhancement module 108 (518).

Further, the network interface 105 determines the received packet is a program uninstall request packet if the extracted NIF processing code 741 is "2". Therefore, the network interface 105 extracts the program name 904 from the payload 112 of the received packet and then deletes the program having the extracted program name 904.

Next, the network interface 105 updates the forwarding table 401 (517-3). In this case, the network interface 105 deletes a path from the forwarding table 401.

Specifically, the network interface 105 extracts the packet specification code 731 from the payload 112 of the received packet. Then, the network interface 105 selects a record, in which the extracted packet specification code matches the packet specification code 731 in the packet specification code management table 730, from the packet specification code management table 730. Then, the network interface 105 extracts the packet kind 732 from the selected record.

Next, the network interface 105 selects a record, in which the extracted packet kind 732 matches the header information 402 in the forwarding table 401, from the forwarding table 401. Then, the network interface 105 deletes the selected record from the forwarding table 401.

The network interface 105 updates the forwarding table 401 in the above-described manner. Then, the packet communication apparatus 101 terminates the addition process of the function enhancement module 108 (518).

FIG. 11A is a configuration diagram of a module-program management table 820 according to the embodiment of the present invention.

The module-program management table 820 is stored in the intra-node memory 104.

The module-program management table 820 represents the association between the function enhancement modules 108 and programs.

A module kind 822 is the unique identifier of service realized by the function enhancement module 108. The program name 821 is the unique identifier of a program.

When the function enhancement module 108 of the module kind 822 is using the program having the program name 821, a round mark is stored in the corresponding box in the module-program management table 820.

Further, the module-program management table 820 contains a reference counter (ref) 823, a storage method 824, and a packet specification code 825.

The reference counter 823 indicates the number of the function enhancement modules 108 using the program. The reference counter 823 becomes the same number of round marks stored in the record corresponding to the program.

The storage method 824 represents a method of storing the program.

Specifically, if the storage method 824 is "1", the intra-node memory 104 stores the program. Further, if the storage method 824 is "2", the intra-node memory 104 stores the location information of the program. Furthermore, if the storage method 824 is "3", the function enhancement module 108 stores the program although the intra-node memory 104 stores neither the program nor the location information of the program. Moreover, if the storage method 824 is "4", the function enhancement module 108 stores the location information of the program although the intra-node memory 104 stores neither the program nor the location information of the program.

The packet specification code 825 is the unique identifier of the kind of packet processed by the function enhancement module 108. Note that, the packet specification code 825 uses the same identifier as that of the packet specification code 731 in the packet specification code management table 730.

The intra-node memory 104 stores the module-program management table 820, and accordingly the node management processor 102 can immediately determine the method of obtaining the program and the location of the program.

Figure 11B:
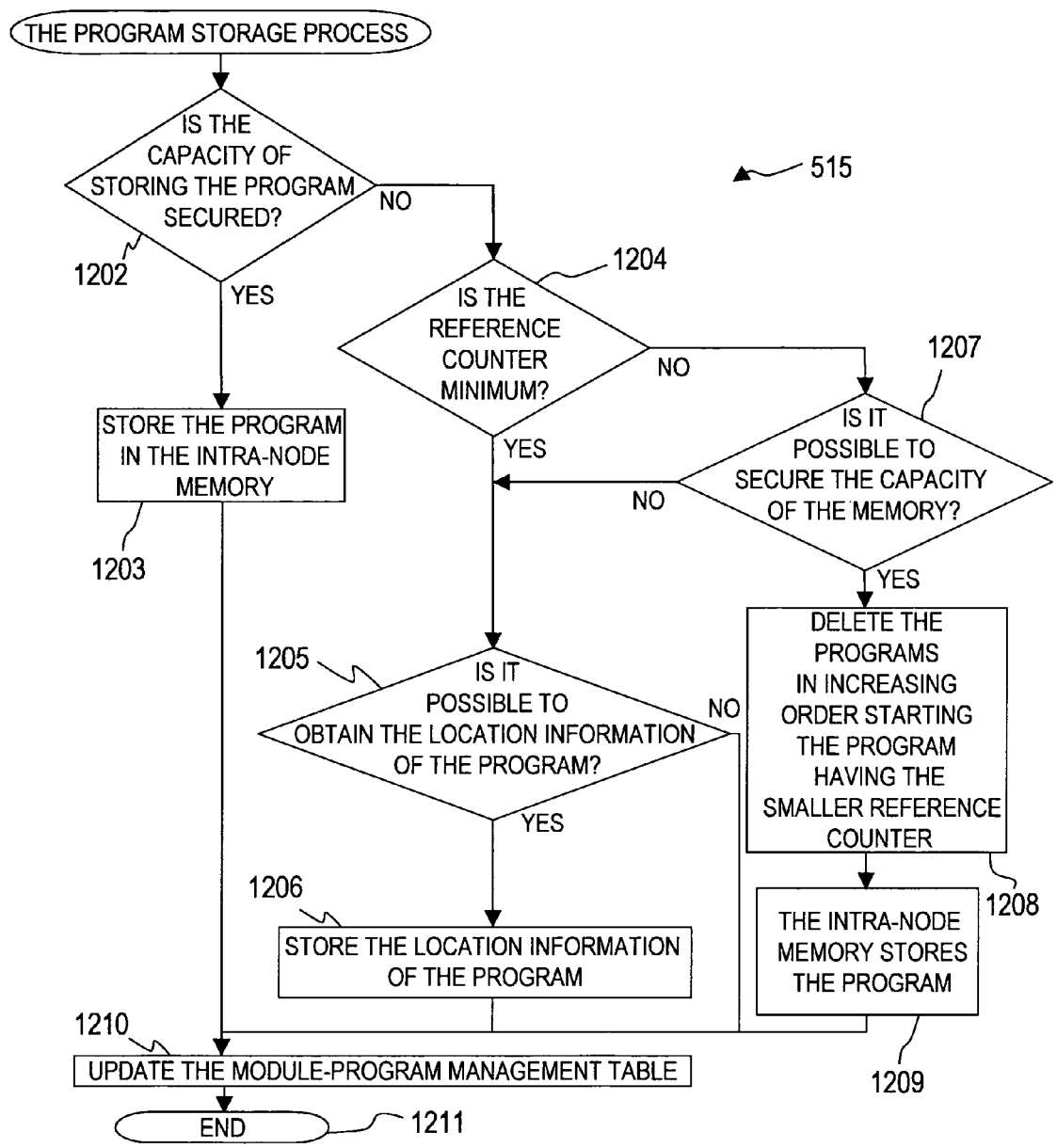
FIG. 11B is a flow chart of a program storage process of a node management processor according to the embodiment of the present invention.

FIG. 11B is a flow chart of the program storage process of the node management processor 102 according to the embodiment of the present invention.

When the node management processor 102 updates the NIF-program management table 800 in Step 514 of the function enhancement module addition process (FIG. 8), the node management processor 102 starts the program storage process (515).

First, it is determined whether or not the capacity of storing the program, which has been obtained in Steps 506-1 to 506-3 of the function enhancement module addition process (FIG. 8), is secured in the intra-node memory 104 (1202).

If the storage capacity is secured, the program is stored in the intra-node memory 104 (1203). Then, the flow proceeds to Step 1210.

On the other hand, if the storage capacity is not secured, the node management processor 102 selects a record in which the program name of the program matches the program name 821 in the module-program management table 820. Then, the reference counter 823 is extracted from the selected record. Then, all records in which the storage method 824 is "1" in the module-program management table 820 are selected.

Next, the extracted reference counter is compared with the reference counters 823 of all the records in which the storage method 824 is "1". Then, it is determined whether or not the extracted reference counter is minimum among all the reference counters 823 which have been compared therewith (1204).

If the extracted reference counter is minimum, it is determined that the program is not to be stored. Therefore, it is determined whether or not the location information of the program can be obtained from the function enhancement module 108 (1205).

If the location information of the program can not be obtained, the flow proceeds to 1210 without performing any other processes.

On the other hand, if the location information of the program can be obtained, the obtained location information of the program is stored in the intra-node memory 104 (1206). Then, the flow proceeds to 1210.

On the other hand, if it is determined that the extracted reference counter is not minimum in Step 1204, all the program names 821 corresponding to the reference counters 823 that are smaller than the extracted reference counter are extracted from the module-program management table 820.

Next, in the case where all the programs having the extracted program names are deleted, it is determined whether or not the capacity of storing the program can be secured in the intra-node memory 104 (1207).

If it is determined that the capacity of storing the program can not be secured, the flow proceeds to Step 1205.

On the other hand, if it is determined that the capacity of storing the program can be secured, the programs are sequentially deleted in increasing order starting from the program having the smallest reference counter 823 in the module-program management table 820 (1208). Then, the programs are repeatedly deleted until the capacity of storing the program can be secured.

Note that the programs may be deleted in the order of the stored date and time starting from the oldest program, instead of deleting the programs in increasing order starting from the program having the smallest reference counter 823.

If the intra-node memory 104 secures the capacity of storing the program, the program are stored in the intra-node memory 104 (1209).

Next, the node management processor 102 updates the module-program management table 820 (1210).

Specifically, the node management processor 102 adds a new record to the module-program management table 820. Then, the kind of the function enhancement module 108 added in Step 501 (FIG. 8) is stored in the module kind 822 of the new record.

Next, the node management processor 102 selects a box, in which the program name of the program stored in the intra-node memory 104 matches the program name 821 in the module-program management table 820, from the new record. Then a round mark is stored in the selected box.

Next, the node management processor 102 selects a record, in which the program name of the program stored in the intra-node memory 104 matches the program name 821 in the module-program management table 820, from the module-program management table 820. Then, the reference counter 823 of the selected record is incremented.

Next, in the case where the method of storing the program is changed, the storage method 824 for the selected record is changed to the corresponding value.

The module-program management table 820 is updated as described above, and then the program storage process is terminated (1211).

Here, in the case where a plurality of programs are obtained in Steps 506-1 to 506-3 (FIG. 8), the program storage process is repeated the same number of times as the number of programs.

As described above, the intra-node memory 104 stores the program to be installed by the network interface 105. Thereby, the node management processor 102 does not need to obtain the program from the function enhancement module 108 or an external apparatus when the node management processor 102 transmits the program to the network interface 105. In other words, the process of the node management processor 102 can be performed faster because the node management processor 102 obtains the program, which is transmitted to the network interface 105, from the intra-node memory 104.

Further, the intra-node memory 104 stores the program having a larger reference counter 823. In other words, the node management processor 102 can obtain the program, which is more likely to be transmitted to the network interface 105, from the intra-node memory 104. Therefore, the node management processor 102 can reduce the number of times of obtaining the program from the function enhancement module 108.

Further, in the case where the intra-node memory 104 can not store the program, the intra-node memory 104 stores the location information of the program. Thereby, the node management processor 102 can omit a process of making inquiries about the location information of the program to the function enhancement module 108.

Figure 12:
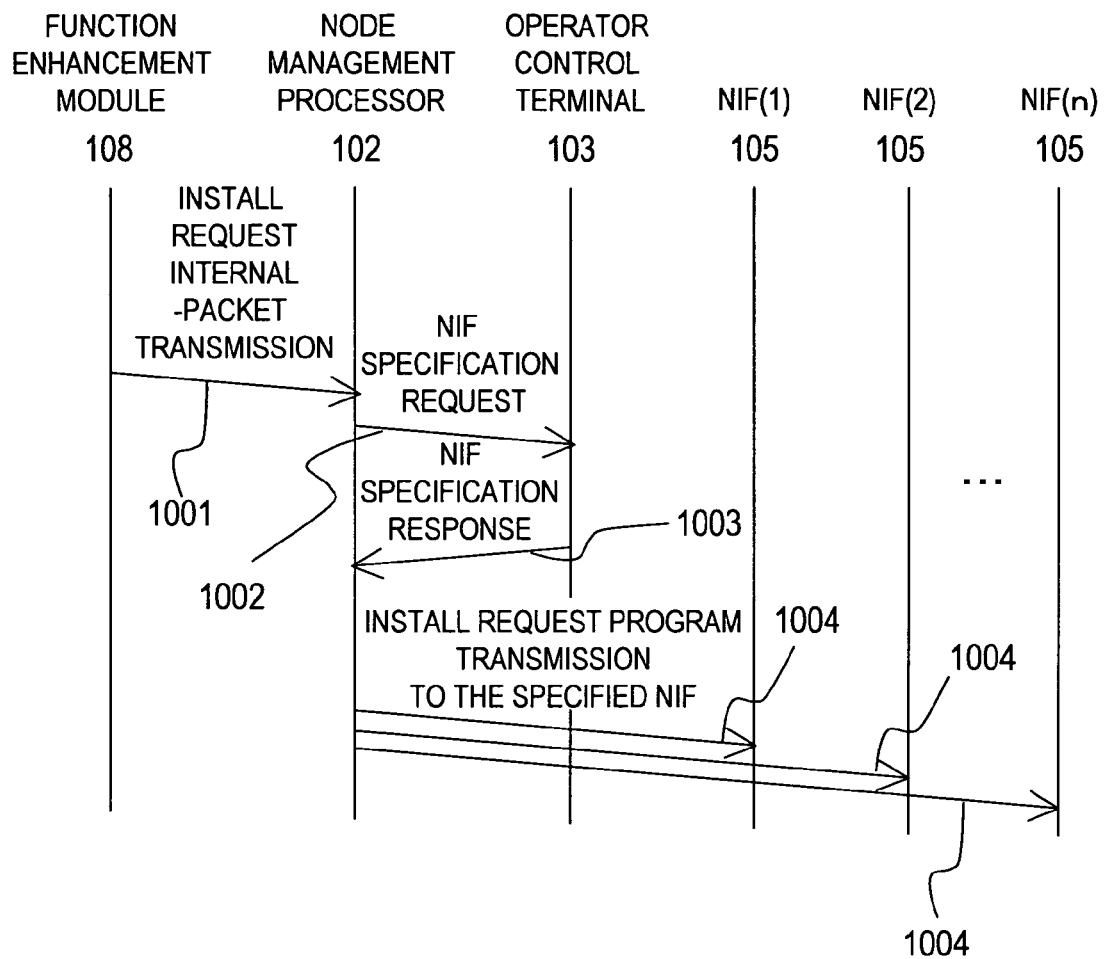
FIG. 12 is a sequence diagram of the function enhancement module addition process of the packet communication apparatus according to the embodiment of the present invention.

FIG. 12 is a sequence diagram of the function enhancement module addition process in the packet communication apparatus 101 according to the embodiment of present invention.

The sequence diagram represents representative processes of the packet communication apparatus 101 to which the function enhancement module 108 has been added.

First, the function enhancement module 108 is added to the module interface 106. Then, the function enhancement module 108 produces the install request internal packet having the program stored in the payload 112. Then, the function enhancement module 108 transmits the produced install request internal packet to the node management processor 102 (1001).

Then, the node management processor 102 receives the install request internal packet from the function enhancement module 108. Then, the node management processor 102 transmits a specification request of the network interface 105 for installing the program to the operator control terminal 103 (1002).

Then, the operator control terminal 103 displays the content of the received specification request. The operator inputs the specification of the network interface 105 in the operator control terminal 103. In this case, the network interface (1) 105, the network interface (2) 105, and the network interface (3) 105 are assumed to be specified by the operator. Then, the operator control terminal 103 transmits an NIF specification response containing the input content to the node management processor 102 (1003).

The node management processor 102 receives the NIF specification response from the operator control terminal 103. Then, the node management processor 102 stores the internal address of the network interface 105 specified with the received NIF specification response in the destination address, and further, produces the program install request packet having the program stored in the payload 112.

The node management processor 102 transmits the produced program install request packet to all the network interfaces 105 specified with the received NIF specification response (1004). Namely, the node management processor 102 transmits the program install request packet to the network interface (1) 105, the network interface (2) 105, and the network interface (3) 105.

The network interface 105 which has received the program install request packet installs the program stored in the received packet.

Then, the packet communication apparatus 101 terminates the addition process of the function enhancement module 108.

Next, the effect of the packet communication apparatus 101 according to the embodiment will be described.

Here, the explanation will be made to the case where the function enhancement module 108 to be added is a denial of service (DoS) attack protection module.

First, the DoS attack protection module collects flow statistic information from the header of a packet. The flow statistic information is an address, a port number, and the like. Next, the DoS attack protection module analyzes the collected flow statistic information, and accordingly identifies the characteristics of a packet relating to the DoS attack. Then, when the DoS attack protection module receives the packet having the identified characteristics, the DoS attack protection module discards the same without transferring.

Here, for the clarification of the effect of the present invention, the explanation will be made to a process of a conventional inflexible transfer apparatus to which the DoS attack protection module is added.

The configuration of the conventional inflexible transfer apparatus may be the same as or different from that of the packet communication apparatus 101 (FIG. 1A) according to the embodiment. In this case, for the purpose of easily comparing with the embodiment, the explanation will be made to the case where the configuration of the conventional inflexible transfer apparatus is the same as that of the packet communication apparatus 101.

Figure 13A:
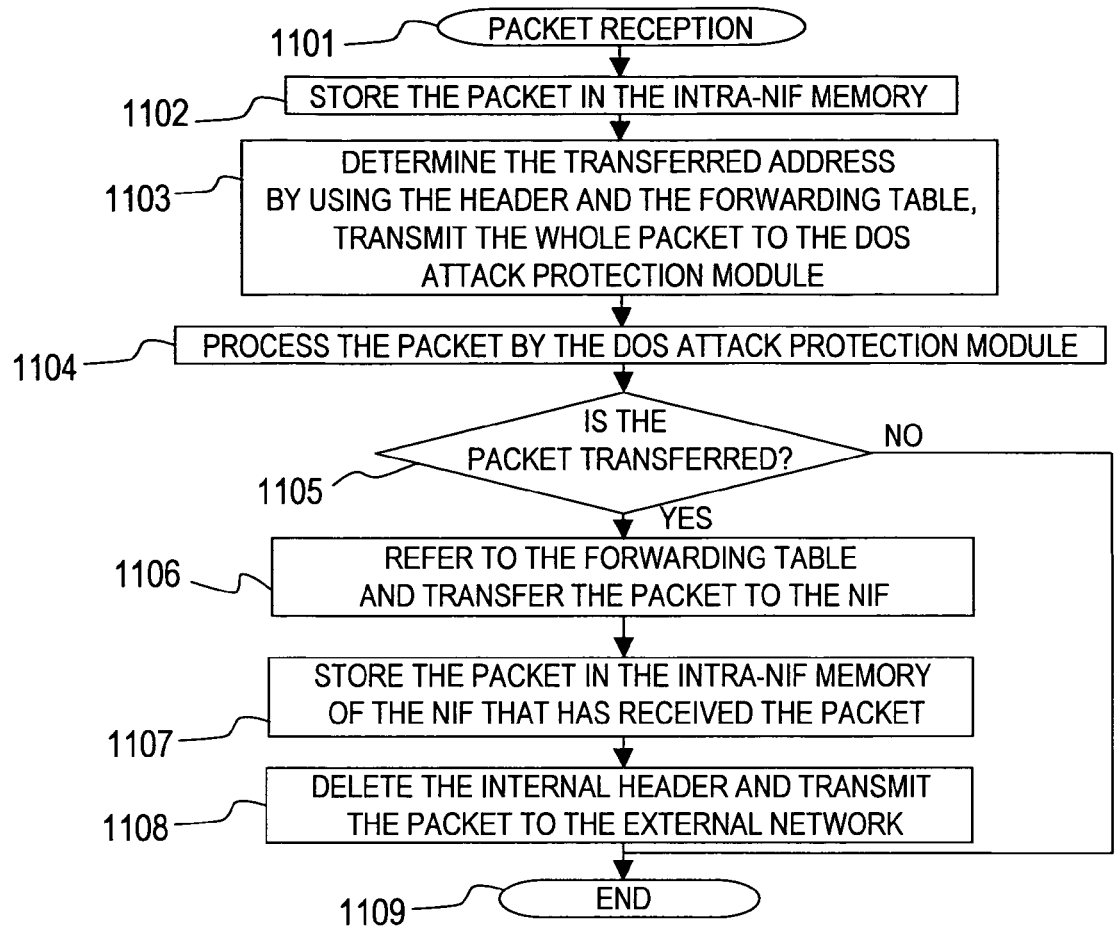
FIG. 13A is a flow chart of a packet transfer process of a conventional inflexible transfer apparatus.

FIG. 13A is a flow chart of a packet transfer process of the conventional inflexible transfer apparatus.

First, the network interface 105 receives a packet from the external network 110 (1101).

Next, the network interface 105 stores the received packet in the intra-NIF memory 302 (1102).

Next, the network interface 105 extracts the header from the packet stored in the intra-NIF memory 302. Then, the network interface 105 compares the extracted header with the forwarding table 401, and accordingly determines the transferred address for the packet. Here, the network interface 105 determines the DoS attack protection module as the transferred address.

Next, the network interface 105 adds the internal header having the internal address of the DoS attack protection module as the destination address, to the packet stored in the intra-NIF memory 302. Then, the network interface 105 transmits the packet with the internal header added, to the DoS attack protection module through the internal switch 109 (1103).

Upon reception of the packet, the DoS attack protection module processes the received packet (1104). Specifically, the DoS attack protection module deletes the internal header from the received packet. Then, the DoS attack protection module collects the flow statistic information from the header of the packet with the internal header deleted. Then, the DoS attack protection module analyzes the collected flow statistic information, and accordingly identifies the packet relating to the DoS attack.

Next, the DoS attack protection module determines whether or not the packet is transferred to another unit in the apparatus (1105). Specifically, the DoS attack protection module determines that the packet is not transferred to another unit in the apparatus if the packet has the characteristics of the packet relating to the DoS attack.

If it is determined that the packet is not transferred, the DoS attack protection module discards the packet. Then, the inflexible transfer apparatus terminates the packet transfer process.

On the other hand, if it is determined that the packet is transferred, the DoS attack protection module compares the header of the packet with the forwarding table to thereby determine the transferred address of the packet. In this case, the DoS attack protection module determines the network interface 105 as the transferred address.

Next, the DoS attack protection module adds the internal header having the internal address of the network interface 105, which has been determined as the transferred address, as the destination address to the packet. Next, the DoS attack protection module transmits the packet with the internal header added, to the network interface 105 of the transferred address through the internal switch 109 (1106).

Then, the network interface 105 stores the packet received from the DoS attack protection module in the intra-NIF memory 302 (1107).

The network interface 105 deletes the internal header from the packet stored in the intra-NIF memory 302. Next, the network interface 105 compares the header of the packet with the internal header deleted, with the forwarding table 401, and accordingly determines the transferred address for the packet. In this case, the network interface 105 determines the external network 110 as the transferred address.

Next, the network interface 105 replaces the header of the packet stored in the intra-NIF memory 302 with the header having the external network 110 as the destination.

Next, the network interface 105 transmits the packet to the external network 110 (1108). Then, the conventional inflexible transfer apparatus terminates the packet transfer process (1109).

The conventional inflexible transfer apparatus transfers the packet in the above-described manner.

It has been necessary for the network interface 105 to transfer all the received packets to the DoS attack protection module in the conventional inflexible transfer apparatus. The necessity of transferring all the received packets also arises in the case where the function enhancement module connected to the inflexible transfer apparatus is not only the DoS attack protection module, but also the module for analyzing or filtering the packets.

The DoS attack protection module performs a sophisticated analyze process on all the transferred packets. Therefore, the process of the DoS attack protection module causes the throughput of the whole apparatus to decrease.

Further, the DoS attack protection module transfers the packet having been subjected to the analyze process to the network interface 105. Therefore, it has been necessary for the DoS attack protection module to contain the forwarding table 401. Moreover, it has been necessary for the DoS attack protection module to manage transferring paths of packets.

The packet communication apparatus 101 according to the embodiment can perform the packet transfer process in which these problems are solved.

Figure 13B:
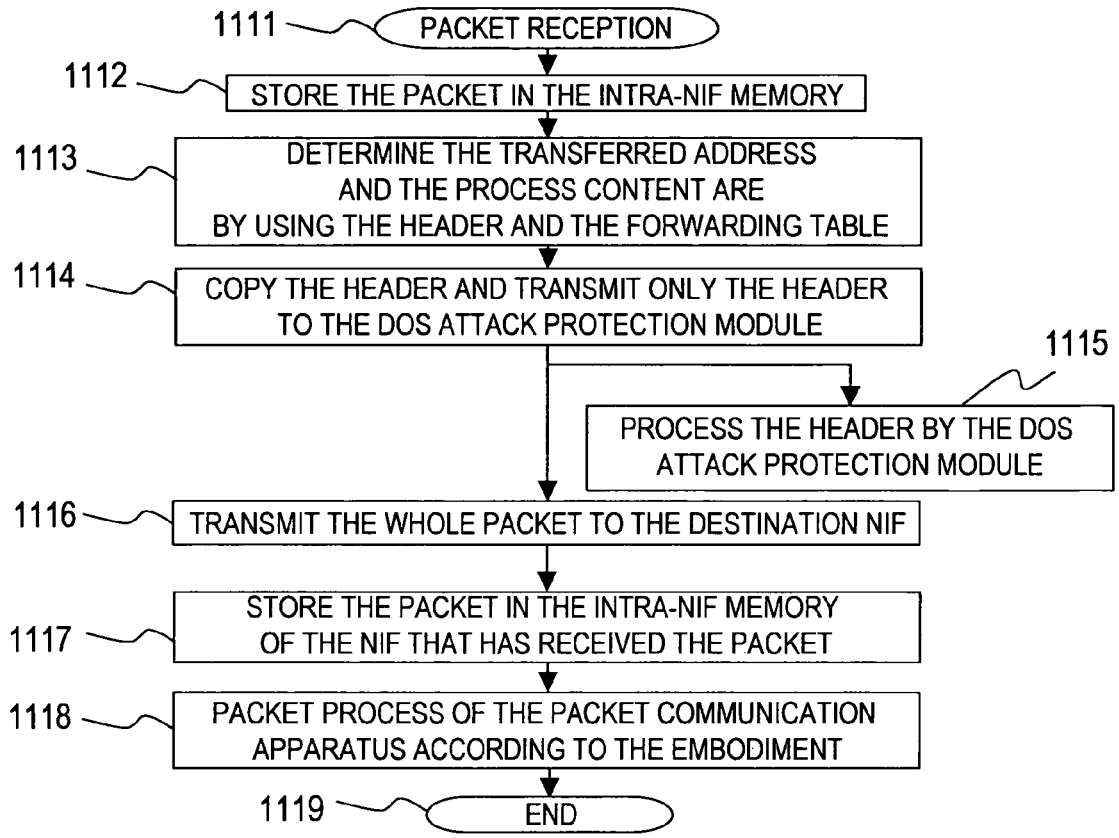
FIG. 13B is a flow chart of the packet transfer process of the packet communication apparatus according to the embodiment of the present invention.

FIG. 13B is a flow chart of the packet transfer process of the packet communication apparatus 101 according to the embodiment of the present invention.

The packet communication apparatus 101 according to the embodiment can install a program to the network interface. Here, a program associated with the DoS attack protection module is installed to the network interface 105. The program copies the header of the packet received from the external network 110, and then transfers only the copied header to the DoS attack protection module.

Hereinafter, the packet transfer process in the packet communication apparatus 101 will be described in the case where the network interface 105 having the program installed receives a packet.

First, the network interface 105 receives a packet from the external network 110 (1111).

Next, the network interface 105 stores the received packet in the intra-NIF memory 302 (1112).

Next, the network interface 105 extracts the header from the packet stored in the intra-NIF memory 302. Then, the network interface 105 compares the extracted header with the forwarding table 401, and accordingly determines the transferred address and the process content (1113). In this case, the network interface 105 determines the network interface 105, to which the packet is transferred and which is connected with the external network 110, as the transferred address. Further, the network interface 105 determines the execution of the program associated with the DoS attack protection module as the process content.

Next, the network interface 105 executes the program to process the packet. Specifically, the network interface 105 copies the header of the packet stored in the intra-NIF memory 302, and then transfers only the copied header to the DoS attack protection module (1114).

Next, the network interface 105 adds the internal header having the internal address of the network interface 105, which is the transferred address determined in Step 1113, as the destination address to the packet stored in the intra-NIF memory 302. Next, the network interface 105 transmits the packet with the internal header added, to the network interface 105 of the transferred address through the internal switch 109 (1116).

Then, the network interface 105 of the transferred address stores the received packet in the intra-NIF memory 302 (1117).

The network interface 105 of the transferred address deletes the internal header from the packet stored in the intra-NIF memory 302. Next, the network interface 105 of the transferred address compares the packet with the internal header deleted, with the forwarding table 401, and accordingly determines the transferred address for the packet. In this case, the network interface 105 of the transferred address determines the external network 110 as the transferred address.

Next, the network interface 105 of the transferred address replaces the header of the packet stored in the intra-NIF memory 302 with the header having the external network 110 as the destination.

Next, the network interface 105 of the transferred address transmits the packet to the external network 110 (1118). Then, the packet communication apparatus 101 terminates the packet transfer process (1119).

On the other hand, the DoS attack protection module having received the header from the network interface 105 in Step 1114 processes the received header (1115). Specifically, the DoS attack protection module collects the flow statistic information from the received header. Then, the DoS attack protection module analyzes the collected flow statistic information, and accordingly identifies the characteristics of the header relating to the DoS attack.

Then, when the DoS attack protection module identifies the characteristics of the header relating to the DoS attack, the DoS attack protection module requests the network interface 105 to change the forwarding table 401. The request includes the characteristics of the header relating to the DoS attack.

When the network interface 105 receives the request, the network interface 105 changes the forwarding table 401. The process content 403 associated with the packet having the characteristics of the header relating to the DoS attack is discarded in the forwarding table 401.

The packet communication apparatus 101 according to the embodiment transfers the packet in the above-described manner.

The network interface 105 copies an important part of the packet (for example, the header of an Syn-bit flagged packet) relating to the DoS attack, and transfers only the copied part to the DoS attack protection module.

In other words, the network interface 105 need not transfer the packet itself to the DoS attack protection module. Therefore, the throughput of the whole apparatus can be maintained because the packet communication apparatus 101 transfers the packet without being affected by the process of the DoS attack protection module.

Further, the DoS attack protection module connected with the packet communication apparatus 101 according to the embodiment need not contain the forwarding table 401 because the DoS attack protection module does not transfer the packet.

Moreover, the load imposed on the DoS attack protection module connected to the packet communication apparatus 101 according to the embodiment can be lightened because the DoS attack protection module receives only the information necessary for the process.

Furthermore, the network interface 105 in the packet communication apparatus 101 according to the embodiment can change the installed program. For example, in the case where the important part of the packet relating to the DoS attack is changed, the network interface 105 changes the installed program. Therefore, the packet communication apparatus 101 can immediately respond to the change of the important part of the packet relating to the DoS attack.

Figure 14A:
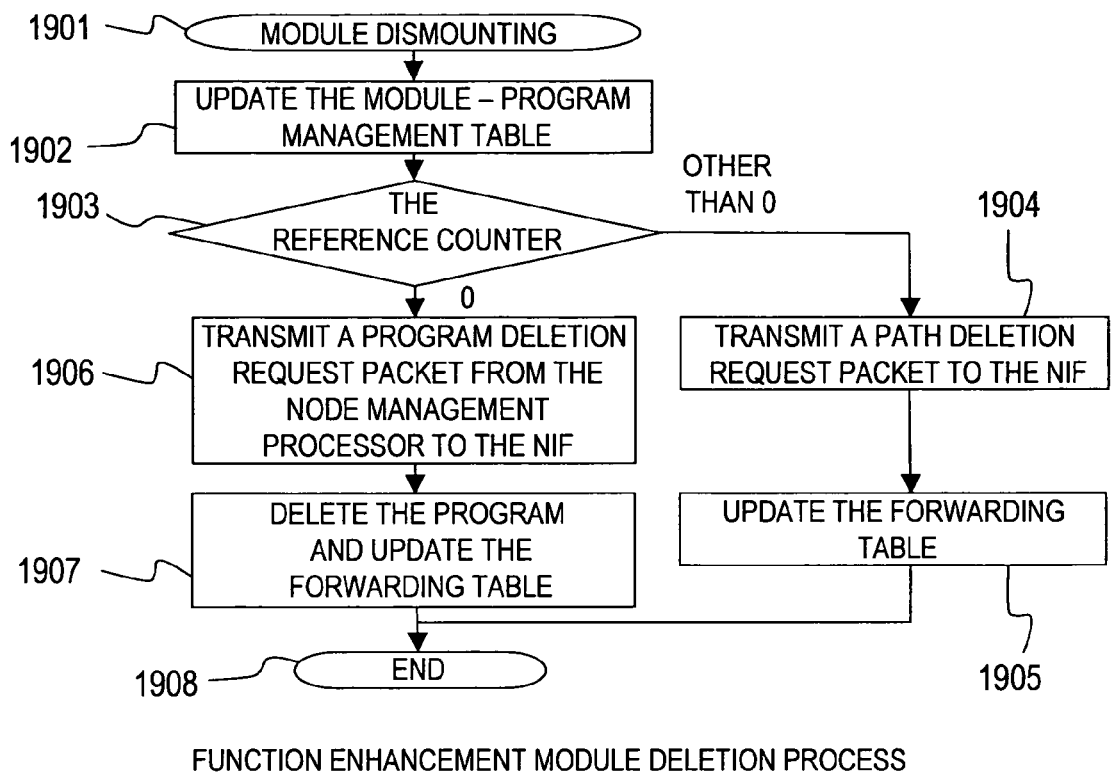
FIG. 14A is a flow chart of a function enhancement module deletion process of the packet communication apparatus according to the embodiment of the present invention.

FIG. 14A is a flow chart of the function enhancement module deletion process of the packet communication apparatus 101 according to the embodiment of the present invention.

The function enhancement module 108 is dismounted from the module interface 106 (1901). Therefore, the packet communication apparatus 101 starts the deletion process of the function enhancement module 108.

Specifically, the function enhancement module 108 detects the fact that the intra-module interface 310 of the function enhancement module 108 has been dismounted from the module interface 106 of the packet communication apparatus 101. When the function enhancement module 108 detects the dismounting, the function enhancement module 108 transmits a function enhancement module deletion request to the node management processor 102.

When the node management processor 102 receives the request, the node management processor 102 updates the module-program management table 820 (1902).

Specifically, the node management processor 102 deletes a record, in which the service realized by the dismounted function enhancement module 108 matches the module kind 822 in the module-program management table 820, from the module-program management table 820.

Further, the node management processor 102 selects a record in which the program name associated with the dismounted function enhancement module 108 matches the program name 821 in the module-program management table 820. Then, the node management processor 102 decrements the reference counter 823 of the selected record.

Next, the node management processor 102 determines whether or not at least one of the reference counters 823 in the updated module-program management table 820 indicates "0" (1903).

If at least one of the reference counters 823 does not indicate "0", the node management processor 102 determines that it is not necessary to delete the program from the network interface 105. Therefore, the node management processor 102 transmits the forwarding table update request packet to the network interface 105 (1904).

Figure 14B:
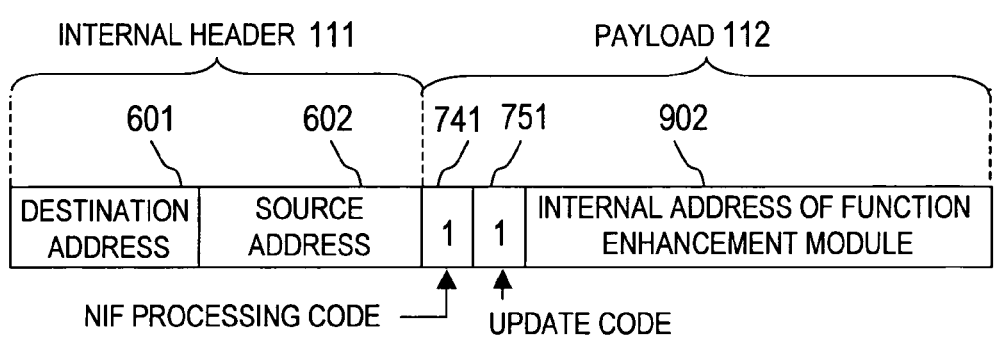
FIG. 14B is a configuration diagram of the forwarding table update request packet according to the embodiment of the present invention.

FIG. 14B is a configuration diagram of the forwarding table update request packet according to the embodiment of the present invention.

The forwarding table update request packet is configured by the internal header 111 and the payload 112.

The internal header 111 contains the destination address 601 and the source address 602.

The destination address 601 is the internal address of the unit which receives the packet in the apparatus. The source address 602 is the internal address of the unit which transmits the packet in the apparatus.

The destination address 601 is the internal address of the network interface 105 in the forwarding table update request packet. Further, the source address 602 is the internal address of the node management processor 102 in the forwarding table update request packet.

The payload 112 contains the NIF processing code 741, the update code 751, and the internal address 902. The node management processor 102 produces the payload 112 of the forwarding table update request packet in the following manner.

First, the node management processor 102 selects a record, in which the content of a process that the network interface 105 is requested to perform matches the NIF processing content 742 in the NIF processing code management table 740, from the NIF processing code management table 740. Next, the NIF processing code 741 is extracted from the selected record. Then, the extracted NIF processing code 741 is stored in the payload 112 of the packet.

The forwarding table update request packet requests the network interface 105 to update the forwarding table 401.

Accordingly, the node management processor 102 stores "1" as the NIF processing code 741 in the payload 112 of the packet.

Next, the node management processor 102 selects a record, in which the content of the forwarding table 401 that the network interface 105 is requested to update matches the NIF updating content 752 in the update code management table 750, from the update code management table 750. Then, the update code 751 is extracted from the selected record. Then, the extracted update code 751 is stored in the payload 112 of the packet.

The forwarding table update request packet in FIG. 14B is transmitted in a process of deleting the function enhancement module 108 from the packet communication apparatus 101. In this process, the network interface 105 deletes a path from the forwarding table 401. Accordingly, the node management processor 102 stores "1" as the update code 751 in the payload 112 of the packet.

Next, the node management processor 102 stores the internal address of the function enhancement module 108, which has been dismounted in Step 1901, in the payload 112 of the packet as the internal address 902 of the function enhancement module, the path for which is deleted.

Here, the explanation will be made with reference to FIG. 14A again.

The network interface 105 receives the forwarding table update request packet.

Next, the network interface 105 extracts the NIF processing code from the payload 112 of the received forwarding table update request packet.

Next, the network interface 105 selects a record, in which the extracted NIF processing code matches the NIF processing code 741 in the NIF processing code management table 740, from the NIF processing code management table 740. Then, the network interface 105 extracts the NIF processing content 742 from the selected record, and then performs a process associated with the extracted NIF processing content 742.

In other words, since the extracted NIF processing code 741 is "1", the network interface 105 determines that the received packet is the forwarding table update request packet. Therefore, the network interface 105 updates the forwarding table 401 (1905).

Specifically, the network interface 105 extracts the update code from the received packet. Then, the network interface 105 selects a record, in which the extracted update code matches the update code 751 in the update code management table 750, from the update code management table 750. Then, the network interface 105 extracts the NIF updating content 752 from the selected record.

Next, the network interface 105 determines the content of the forwarding table 401 to be updated on the basis of the extracted NIF updating content 752.

In this case, since the extracted update code 751 is "1", the network interface 105 deletes the path from the forwarding table 401.

Therefore, the network interface 105 extracts the internal address 902 of the function enhancement module from the payload 112 of the received packet. Then, the network interface 105 deletes all records, in which the internal address 902 of the extracted function enhancement module is contained in the process content 403 in the forwarding table 401, from the forwarding table 401.

The network interface 105 deletes the path to the dismounted function enhancement module 108 from the forwarding table 401 in the above-described manner.

Then, the packet communication apparatus 101 terminates the function enhancement module deletion process (1908).

On the other hand, if at least one of the reference counters 823 indicates "0" in Step 1903, it means that the network interface 105 stores a program which is not utilized by all the function enhancement modules 108 at all. Therefore, the node management processor 102 requests the network interface 105 to delete the program in which the reference counter 823 indicates "0". That is, the node management processor 102 transmits a program deletion request packet to the network interface 105 (1906).

Note that "2" is stored in the program deletion request packet as the NIF processing code 741. Further, the name of the program that the network interface 105 is requested to delete is stored in the program deletion request packet. Moreover, the internal address of the dismounted function enhancement module is stored in the program deletion request packet.

In the case where the program that the network interface 105 is requested to delete is stored in the intra-node memory 104, the node management processor 102 may delete the program from the intra-node memory 104.

The network interface 105 receives the program deletion request packet, and then extracts the NIF processing code from the received packet.

Next, the network interface 105 selects a record, in which the extracted NIF processing code matches the NIF processing code 741 in the NIF processing code management table 740, from the NIF processing code management table 740. Then, the network interface 105 extracts the NIF processing content 742 from the selected record, and then performs a process associated with the extracted NIF processing content 742.

In other words, since the extracted NIF processing code 741 is "2", the network interface 105 determines that the received packet is the program deletion request packet. Therefore, the network interface 105 deletes the program, and further updates the forwarding table 401 (1907).

Specifically, the network interface 105 extracts the program name from the received program deletion request packet. Then, the program having the extracted program name is deleted from the program memory 304.

Next, the network interface 105 extracts the internal address of the function enhancement module from the received program deletion request packet, and then deletes all records, in which the extracted internal address 902 of the function enhancement module is contained in the process content 403 in the forwarding table 401, from the forwarding table 401.

Accordingly, the network interface 105 deletes the path to the dismounted function enhancement module 108 from the forwarding table 401.

Then, the packet communication apparatus 101 terminates the function enhancement module deletion process (1908).

The node management processor 102 determined in Step 1903 whether or not the network interface 105 is requested to delete the program on the basis of the reference counter 823 in the module-program management table 820. However, the node management processor 102 may determine the same on the basis of not only the reference counter, but also a state of the load imposed on the network interface 105, including the memory capacity of the program memory 304 of the network interface 105 and the like.

Figure 15:
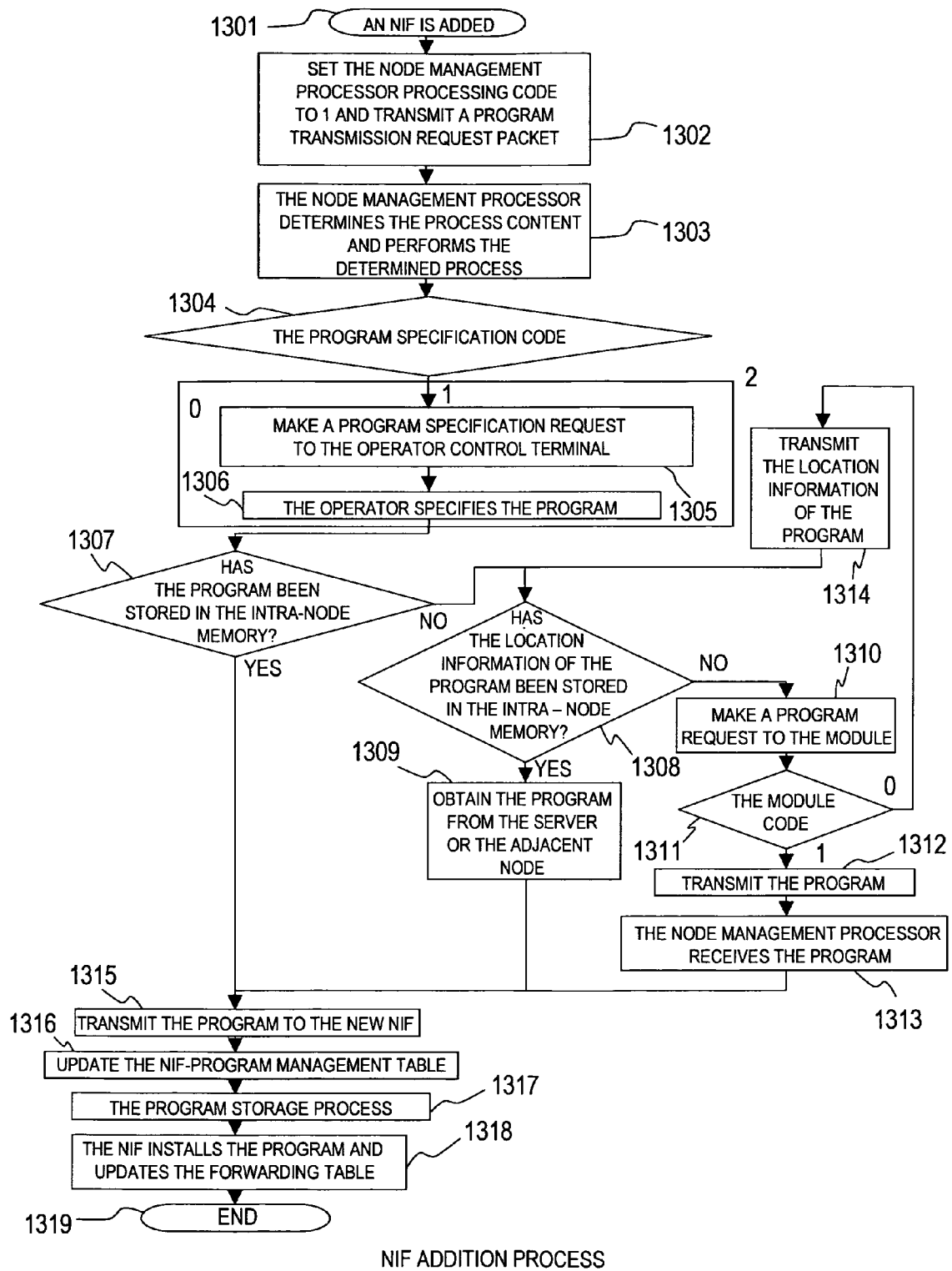
FIG. 15 is a flow chart of an NIF addition process of the packet communication apparatus according to the embodiment of the present invention.

FIG. 15 is a flow chart of the NIF addition process of the packet communication apparatus 101 according to the embodiment of the present invention.

A new network interface 105 is connected with the internal switch 109 (1301). Therefore, the packet communication apparatus 101 starts the NIF addition process.

Specifically, the network interface 105 detects the fact that the internal interface 305 of the network interface 105 has been connected with the internal switch 109. When the network interface 105 detects the connection, the network interface 105 transmits a program transmission request packet to the node management processor 102 (1302).

The program transmission request packet requests the node management processor 102 to transmit a program.

Figure 16A:
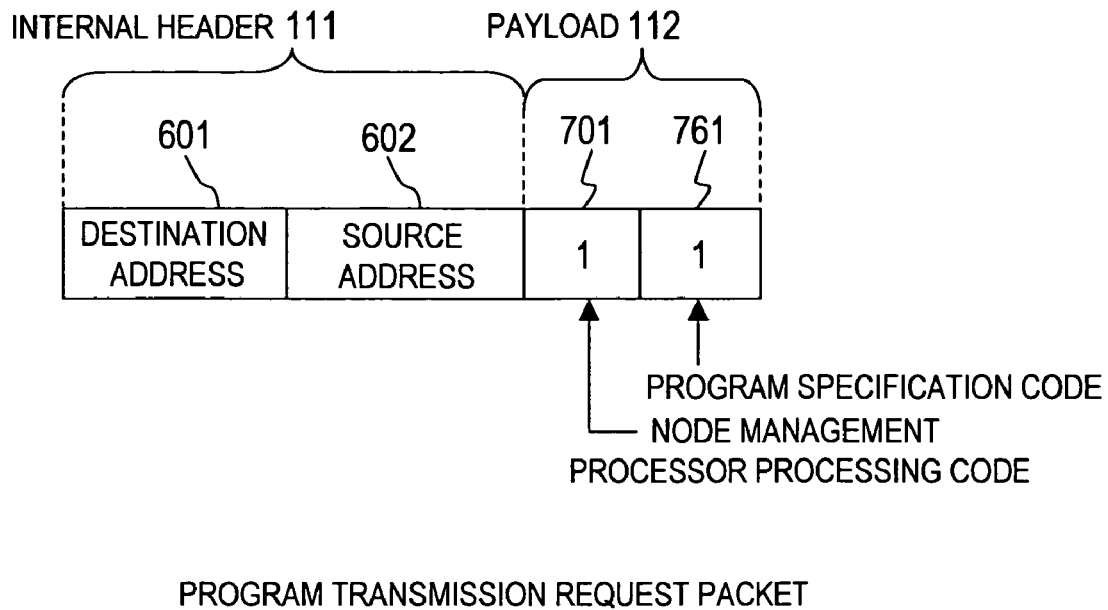
FIG. 16A is a configuration diagram of a program transmission request packet according to the embodiment of the present invention.

FIG. 16A is a configuration diagram of the program transmission request packet according to the embodiment of the present invention.

The program transmission request packet is configured by the internal header 111 and the payload 112.

The internal header 111 contains the destination address 601 and the source address 602.

The destination address 601 is the internal address of the unit which receives the packet in the apparatus. The source address 602 is the internal address of the unit which transmits the packet in the apparatus.

The destination address 601 is the internal address of the node management processor 102 in the program transmission request packet. Further, the source address 602 is the internal address of the newly added network interface 105 in the program transmission request packet.

The payload 112 contains the node management processor processing code 701 and the program specification code 761.

The network interface 105 produces the payload 112 of the program transmission request packet in the following manner.

First, the network interface 105 selects a record, in which the content of a process that the node management processor 102 is requested to perform matches the process content 702 in the node management processor processing code management table 700, from the node management processor processing code management table 700. Next, the node management processor processing code 701 is extracted from the selected record. Then, the extracted node management processor processing code 701 is stored in the payload 112 of the packet.

The program transmission request packet requests the node management processor 102 to transmit a program. Accordingly, the function enhancement module 108 stores "1" as the node management processor processing code 701 in the payload 112 of the packet.

Next, the network interface 105 selects a record, in which the program that the network interface 105 requests to install matches the transmission program 762 in the program specification code management table 760, from the program specification code management table 760. Then, the program specification code 761 is extracted from the selected record. Then, the extracted program specification code 761 is stored in the payload 112 of the packet.

The program transmission request packet in FIG. 16A is for the case where the operator is made to specify the program installed by the network interface 105. Therefore, the network interface 105 stores "1" as the program specification code 761 in the payload 112 of the packet.

Note that, in the case where "2" is stored as the program specification code 761 in the payload 112 of the packet, the network interface 105 stores "2" together with the program name of the program to be requested, in the payload of the packet.

The explanation will be made with reference to FIG. 15 again.

The node management processor 102 receives the program transmission request packet. Then, the node management processor 102 extracts the node management processor processing code from the payload 112 of the received program transmission request packet.

Next, the node management processor 102 selects a record, in which the extracted node management processor processing code matches the node management processor processing code 701 in the node management processor processing code management table 700 (FIG. 5A), from the node management processor processing code management table 700. Then, the process content 702 is extracted from the selected record.

Then, the node management processor 102 performs a process associated with the extracted process content 702 (1303). In this case, since the node management processor processing code is "1", the specified program is transmitted to the network interface 105.

Specifically, the node management processor 102 extracts the program specification code from the received program transmission request packet.

Next, the node management processor 102 selects a record, in which the extracted program specification code matches the program specification code 761 in the program specification code management table 760, from the program specification code management table 760. Then, the transmission program 762 is extracted from the selected record.

Next, the node management processor 102 determines the program to be transmitted to the network interface 105 on the basis of the extracted transmission program 762.

Specifically, if the extracted program specification code is "0", the node management processor 102 determines that all programs relating to the function enhancement module 108 are transmitted, and then and then the flow proceeds to Step 1307.

Further, if the extracted program specification code is "2", the node management processor 102 extracts the program name from the received program transmission request packet. Then, the node management processor 102 determines that the program having the extracted program name is transmitted, and then the flow proceeds to Step 1307.

Further, if the extracted program specification code is "1", the node management processor 102 determines that the operator is made to specify the program to be transmitted to the network interface 105. Then, the node management processor 102 transmits the program specification request to the operator control terminal 103. The program specification request contains the NIF number of the newly added network interface.

Then, the operator control terminal 103 displays information associated with the received program specification request.

Figure 17:
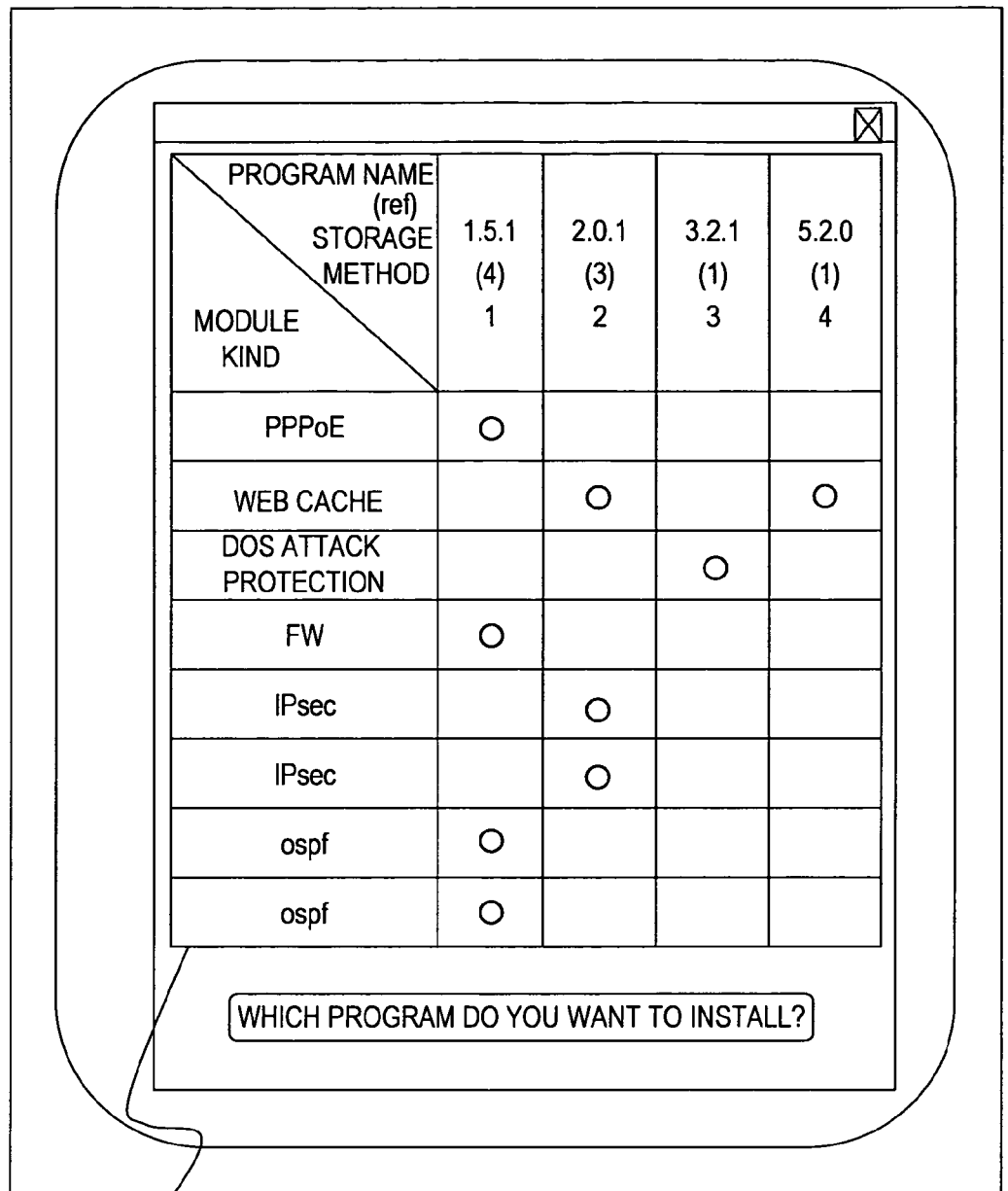
FIG. 17 is an explanatory diagram of the display screen of the operator control terminal, which has received a program specification request, according to the embodiment of the present invention.

FIG. 17 is an explanatory diagram of the display screen of the operator control terminal 103, which has received the program specification request, according to the embodiment of the present invention.

The operator control terminal 103 displays the module-program management table 820 and the like.

The operator can recognize the association between the function enhancement modules 108 and programs by referring to the module-program management table 820 displayed on the operator control terminal 103. Therefore, the operator can determine the program to be installed to the newly added network interface 105. Then, the operator specifies the determined program on the operator control terminal 103.

However, the display screen contains much information being displayed. Therefore, it is difficult for the operator to intuitively determine the program to be installed to the network interface 105, so that the operator control terminal 103 may display in the following manner.

Figure 18A:
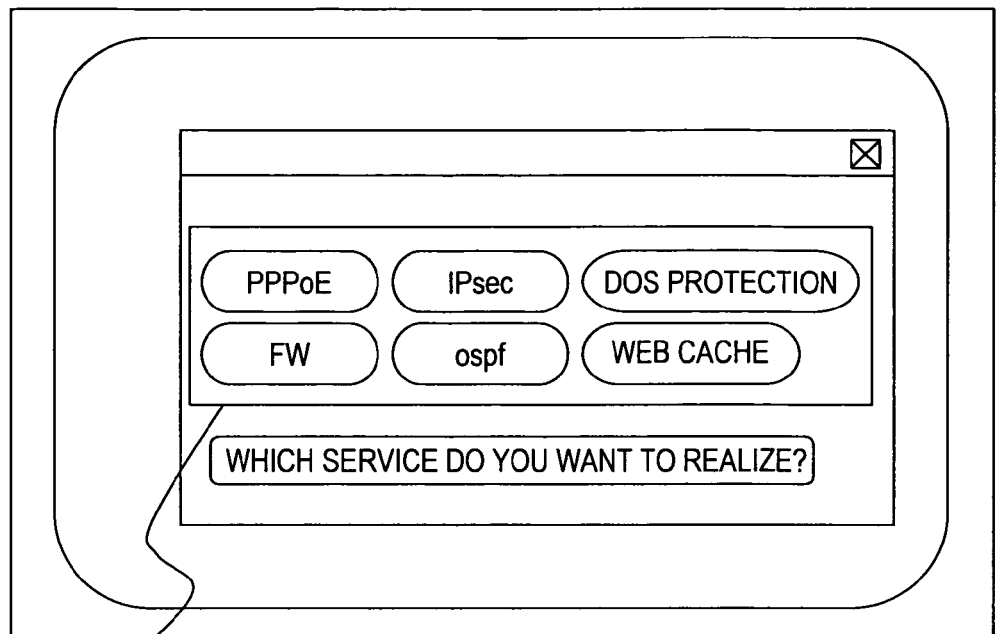
FIG. 18A is an explanatory diagram of the display screen of the operator control terminal, which has received the program specification request, according to the embodiment of the present invention.

FIG. 18A is an explanatory diagram of the display screen of the operator control terminal 103, which has received the program specification request, according to the embodiment of the present invention.

The operator control terminal 103 displays the kinds of services provided by the function enhancement modules 108.

Then, the operator selects the service to be realized by the newly added network interface 105 on the operator control terminal 103.

Then, the operator control terminal 103 determines the program to be used by the function enhancement module providing the selected service from the module-program management table 820. Then, the determined program is considered as the program specified by the operator.

In addition, the operator control terminal 103 may display in the following manner.

Figure 18B:
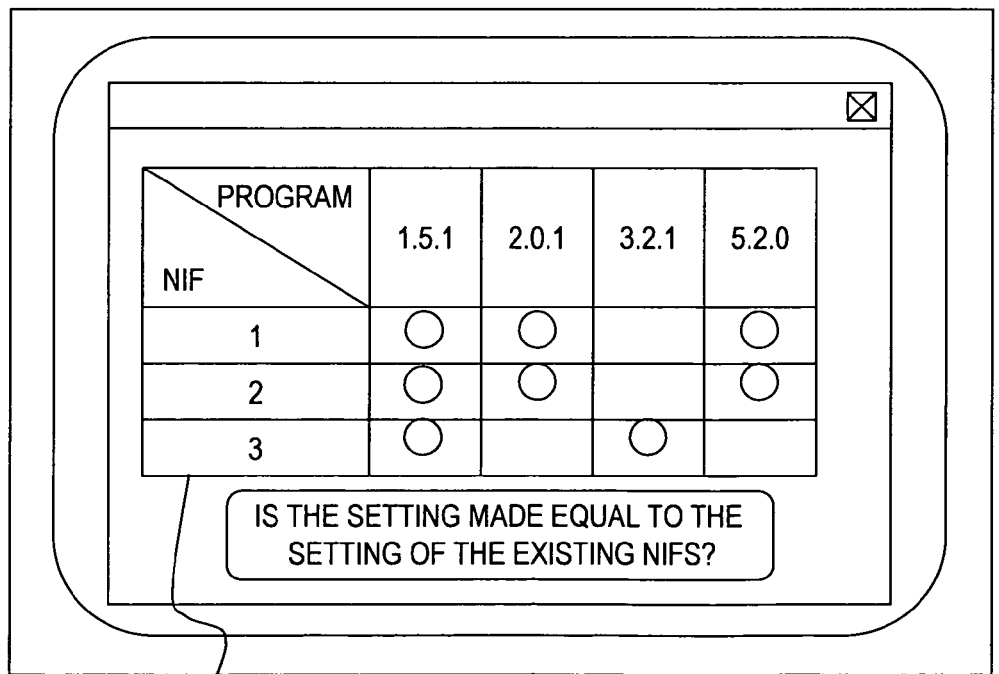
FIG. 18B is an explanatory diagram of the display screen of the operator control terminal, which has received the program specification request, according to the embodiment of the present invention.

FIG. 18B is an explanatory diagram of the display screen of the operator control terminal 103, which has received the program specification request, according to the embodiment of the present invention.

The operator control terminal 103 displays the NIF-program management table 800 and the like.

In this case, the operator can specify the program identical to the program stored in the network interface 105 (the existing network interface 105) which has already been connected with the packet communication apparatus 101. Therefore, the operator can simply specify the program with little wrong setting.

For example, the operator selects one of the existing network interfaces 105 on the operator control terminal 103.

Then, the operator control terminal 103 determines the program stored in the selected network interface 105 from the NIF-program management table 800. Then, the determined program is considered as the program specified by the user.

The explanation will be made with reference to FIG. 15 again.

Next, the operator specifies the program to be installed to the newly added network interface 105 on the operator control terminal 103 (1306). Then, the operator control terminal 103 notifies the node management processor 102 of the specified program.

Next, the node management processor 102 determines the notified program or the storage location of the location information of the notified program by referring to the storage method 824 in the module-program management table 820.

Then, the node management processor 102 determines whether or not the specified program has been stored in the intra-node memory 104 (1307).

If the specified program has been stored in the intra-node memory 104, the node management processor 102 obtains the program from the intra-node memory 104, and then the flow proceeds to Step 1315.

On the other hand, if the specified program has not been stored in the intra-node memory 104, the node management processor 102 can not obtain the program from the intra-node memory 104. Then, the node management processor 102 determines whether or not the location information of the specified program has been stored in the intra-node memory 104 (1308).

If the location information of the specified program has been stored in the intra-node memory 104, the node management processor 102 obtains the program from the server, the node or the like associated with the location information (1309). Then, the flow proceeds to Step 1315.

On the other hand, if the location information of the specified program has not been stored in the intra-node memory 104, the node management processor 102 determines that the information relating to the program can not be obtained from the intra-node memory 104. Then, the node management processor 102 identifies the function enhancement module 108 storing the program by referring to the module-program management table 820. Next, the node management processor 102 transmits a program request packet to the identified function enhancement module 108 (1310).

Figure 16B:
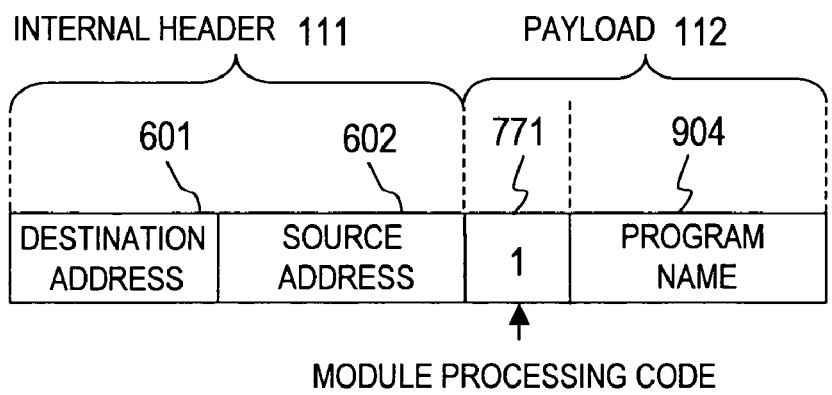
FIG. 16B is a configuration diagram of a program request packet according to the embodiment of the present invention.

FIG. 16B is a configuration diagram of the program request packet according to the embodiment of the present invention.

The program request packet is configured by the internal header 111 and the payload 112.

The internal header 111 contains the destination address 601 and the source address 602.

The destination address 601 is the internal address of the unit which receives the packet in the apparatus.

The source address 602 is the internal address of the unit which transmits the packet in the apparatus.

The destination address 601 is the internal address of the function enhancement module 108 in the program request packet. The source address 602 is the internal address of the node management processor 102 in the program request packet.

The payload 112 contains the module processing code 771 and the program name 904.

The node management processor 102 produces the payload 112 of the program request packet in the following manner.

First, it is determined which of the program or the location information of the program the function enhancement module 108 stores by referring to the storage method 824 in the module-program management table 820.

Specifically, if the storage method 824 in the module-program management table 820 is "3", it is determined that the function enhancement module 108 stores the program. Therefore, since the node management processor 102 requests the program from the function enhancement module 108, the node management processor 102 stores "1" as the module processing code 771 in the payload 112 of the packet.

On the other hand, the storage method 824 in the module-program management table 820 is "4", it is determined that the function enhancement module 108 stores the location information of the program. Therefore, since the node management processor 102 requests the location information of the program from the function enhancement module 108, the node management processor 102 stores "2" as the module processing code 771 in the payload 112 of the packet.

Further, the node management processor 102 stores the program name 906 of the program that the function enhancement module 108 is requested to transmit in the payload 112 of the packet.

The explanation will be made with reference to FIG. 15 again.

The function enhancement module 108 receives the program request packet. Then, the function enhancement module 108 extracts the module processing code from the payload 112 of the received program request packet.

Next, the function enhancement module 108 selects a record, in which the extracted module processing code matches the module processing code 771 in the module processing code management table 770, from the module processing code management table 770. Then, the function enhancement module 108 extracts the module processing content 772 from the selected record, and performs a process associated with the extracted module processing content 772.

Specifically, the function enhancement module 108 determines which of "0" or "1" the extracted module processing code is (1311).

If the extracted module processing code is "0", the function enhancement module 108 is requested to transmit the location information of the program, so that the function enhancement module 108 extracts the program name 904 from the payload 112 of the received program request packet.

Next, the function enhancement module 108 transmits the location information of the program having the extracted program name 904 to the node management processor 102 (1314).

Then, the node management processor 102 stores the received location information of the program in the intra-node memory 104.

Then, the flow returns to Step 1308. In this case, the node management processor 102 determines that the location information of the program is stored in the intra-node memory, so that the node management processor 102 obtains the program from the server, the node, or the like associated with the location information (1309). Then, the flow proceeds to Step 1315.

On the other hand, if the extracted module processing code is "1", the function enhancement module 108 is requested to transmit the program, so that the function enhancement module 108 extracts the program name 904 from the payload 112 of the received program request packet.

Next, the function enhancement module 108 transmits the program having the extracted program name 904 to the node management processor 102 (1312).

Then, the node management processor 102 receives the program from the function enhancement module 108 (1313).

Next, the node management processor 102 transmits the program install request packet containing the received program to the newly added network interface 105 (1315).

Figure 19A:
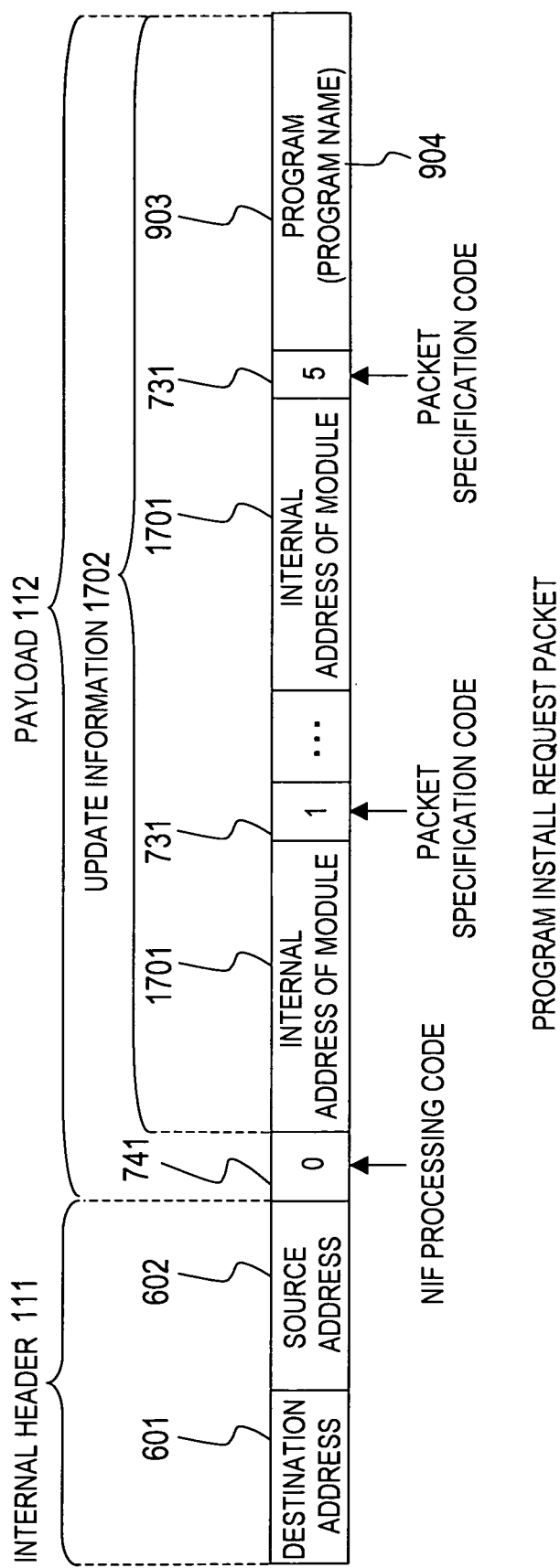
FIG. 19A is a configuration diagram of the program install request packet according to the embodiment of the present invention.

FIG. 19A is a configuration diagram of the program install request packet according to the embodiment of the present invention.

The program install request packet is configured by the internal header 111 and the payload 112.

The internal header 111 contains the destination address 601 and the source address 602.

The destination address 601 is the internal address of the unit which receives the packet in the apparatus.

The source address 602 is the internal address of the unit which transmits the packet in the apparatus.

The destination address 601 is the internal address of the newly added network interface 105 in the program install request packet. The source address 602 is the internal address of the node management processor 102 in the program install request packet.

The payload 112 contains the NIF processing code 741, an internal address 1701 of the function enhancement module, the packet specification code 731, the program 903 and the program name 904. Note that all of the internal address 1701 of the function enhancement module, the packet specification code 731, the program 903 and the program name 904 are considered as update information 1702.

The payload 112 may contain a plurality of the internal addresses 1701 of the function enhancement modules. In this case, the payload 112 contains the packet specification code 731 associated with each function enhancement module 108.

The node management processor 102 produces the payload 112 of the program install request packet in the following manner.

First, the node management processor 102 selects a record, in which the content of a process that the network interface 105 is requested to perform matches the NIF processing content 742 in the NIF processing code management table 740, from the NIF processing code management table 740. Then, the NIF processing code 741 is extracted from the selected record. Then, the extracted NIF processing code 741 is stored in the payload 112 of the packet.

The program install request packet requests the network interface 105 to install the program 903 stored in the payload. Therefore, the node management processor 102 stores "0" as the NIF processing code 741 in the payload 112 of the packet.

Next, the node management processor 102 identifies the function enhancement module 108 using the program by referring to the module-program management table 820. Further, the node management processor 102 identifies the packet specification code of the packet to be processed by the identified function enhancement module 108, and then stores the internal address 902 of the identified function enhancement module 108 and the identified packet specification code 731 in the payload 112 of the packet.

Further, the node management processor 102 stores the program obtained from the intra-node memory 104, the function enhancement module 108, or the like in the payload 112 of the packet.

Figure 19B:
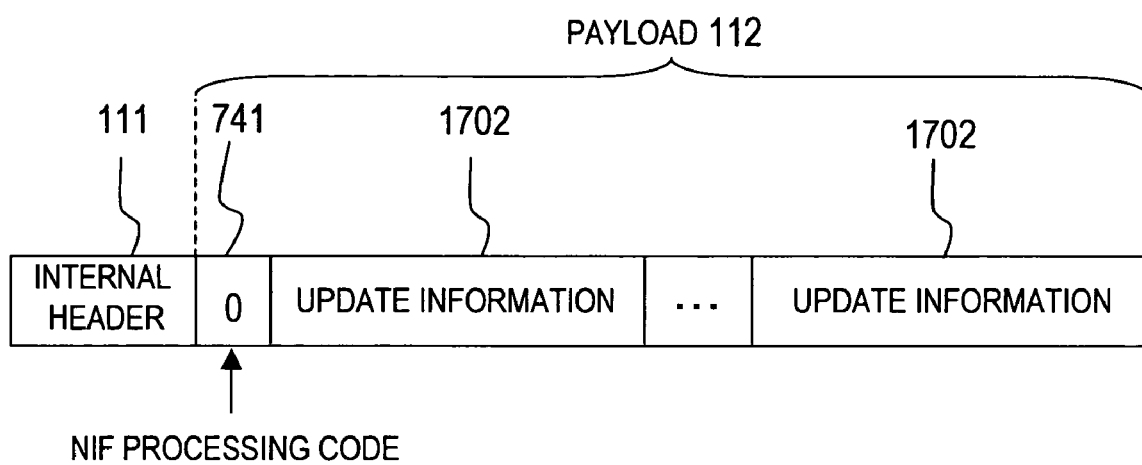
FIG. 19B is a configuration diagram of the program install request packet according to the embodiment of the present invention.

FIG. 19B is a configuration diagram of the program install request packet according to the embodiment of the present invention.

The program install request packet in FIG. 19B contains a plurality of pieces of update information 1702. On the other hand, the program install request packet in FIG. 19A contains only one piece of update information 1702.

In other words, the number of pieces of update information 1702 contained in the program install request packet is not limited.

The other configuration of the program install request packet in FIG. 19B is identical to that in FIG. 19A. Therefore, the identical numerals are given to the identical elements, and accordingly the explanation thereof is omitted.

Here, the explanation will be made with reference to FIG. 15 again.

When the node management processor 102 transmits the program install request packet, the node management processor 102 updates the NIF-program management table 800 (1316).

Specifically, the node management processor 102 stores a round mark in a box in which the program name 904 stored in the program install request packet matches the program name 801 in the NIF-program management table 800, and further the NIF number of the network interface 105 as the destination of the packet matches the NIF number 802 in the NIF-program management table 800.

Next, the node management processor 102 measures the data amount of the program 903 stored in the program install request packet. Then, the node management processor 102 selects the memory remaining ratio 804 of a record in which the NIF number of the network interface 105 as the destination of the packet matches the NIF number 802 in the NIF-program management table 800. Then, the node management processor 102 changes the selected memory remaining ratio on the basis of the measured data amount.

Next, in Step 1317, the node management processor 102 performs the program storage process (FIG. 11B).

On the other hand, the network interface 105 receives the program install request packet from the node management processor 102, and then extracts the NIF processing code from the payload 112 of the received program install request packet.

Next, the network interface 105 selects a record, in which the extracted NIF processing code matches the NIF processing code 741 in the NIF processing code management table 740, from the NIF processing code management table 740. Then, the network interface 105 extracts the NIF processing content 742 from the selected record, and then performs a process associated with the extracted NIF processing content 742.

Specifically, since the extracted NIF processing code 741 is "0", the network interface 105 determines that the received packet is the program install request packet. Therefore, the network interface 105 extracts the program 903 from the payload 112 of the received program install request packet, and then installs the extracted program 903.

Further, the network interface 105 updates the forwarding table 401 (1318).

Specifically, the network interface 105 extracts the packet specification code 731 from the payload 112 of the received packet. Then, the network interface 105 selects a record, in which the extracted packet specification code 731 matches the packet specification code 731 in the packet specification code management table 730, from the packet specification code management table 730. Then, the network interface 105 extracts the packet kind 732 from the selected record.

Next, the network interface 105 adds a new record to the forwarding table 401, and then stores the extracted packet kind 732 in the payload type 405 and the IP address/prefix length 406 of the new record.

Next, the network interface 105 extracts the internal address 902 of the function enhancement module and the program name 904 from the payload 112 of the received packet, and then stores the extracted internal address 902 of the function enhancement module and the extracted program name 904 in the process content 403 of the newly added record.

The network interface 105 updates the forwarding table 401 in the above-described manner. Then, the packet communication apparatus 101 terminates the addition process of the function enhancement module 108 (1319).

Figure 20:
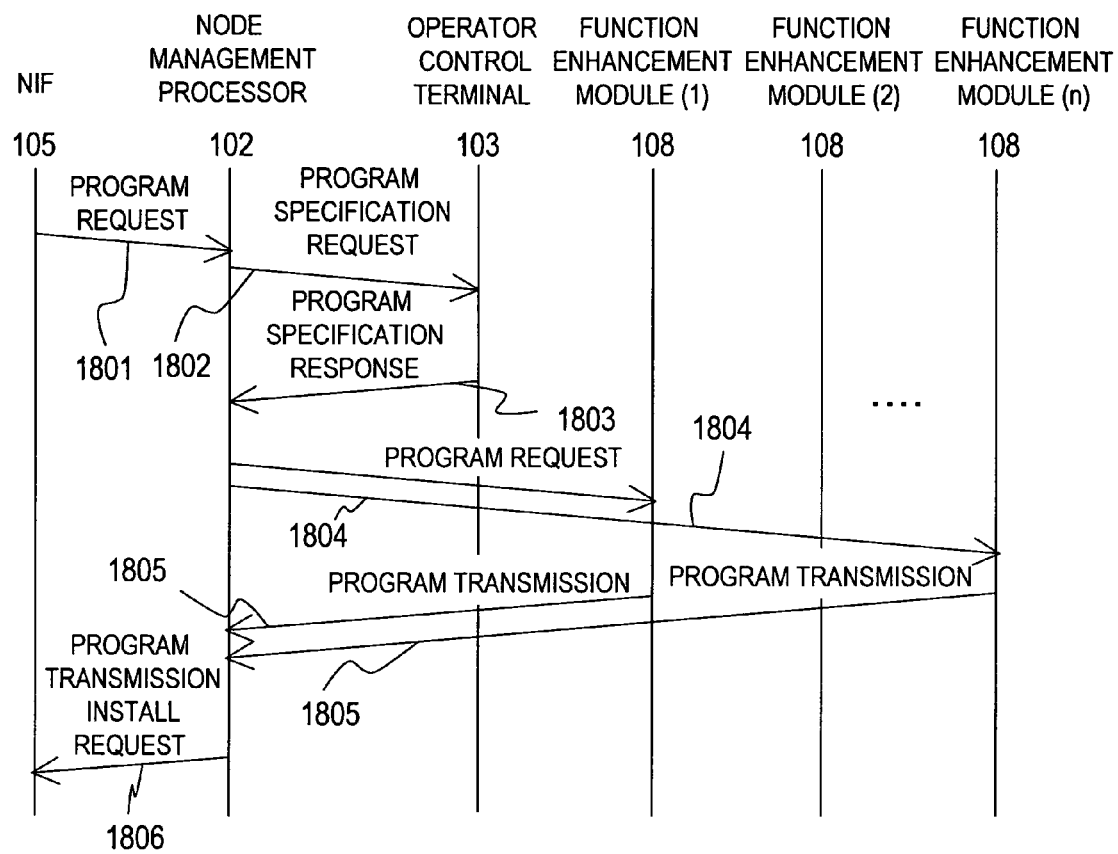
FIG. 20 is a sequence diagram of the NIF addition process of the packet communication apparatus according to the embodiment of the present invention.

FIG. 20 is a sequence diagram of the NIF addition process of the packet communication apparatus according to the embodiment of the present invention.

The sequence diagram represents representative processes of the packet communication apparatus 101 to which the network interface 105 has been added.

First, the network interface 105 is added to the packet communication apparatus 101. Then, the added network interface 105 requests the node management processor 102 to transmit a program (1801).

Then, the node management processor 102 requests the operator control terminal 103 to specify the program to be installed to the network interface 105 (1802).

The operator control terminal 103 displays the content of the received program specification request. The operator inputs the specification of the program to be installed to the network interface 105 to the operator control terminal 103, so that the operator control terminal 103 transmits the program specification response containing the input content to the node management processor 102 (1803).

The node management processor 102 receives the program specification response from the operator control terminal 103. Then, the node management processor 102 identifies the program specified by the operator from the received program specification response, and then determines the function enhancement module 108 storing the identified program, so that the node management processor 102 requests the determined function enhancement module 108 to transmit the identified program (1804).

The function enhancement module 108 that has been requested to transmit the program transmits the requested program to the node management processor 102 (1805).

Then, the node management processor 102 receives the program from the function enhancement module 108.

Next, the node management processor 102 transmits the received program to the network interface 105, and further requests the network interface 105 to install the transmitted program (1806).

Then, the network interface 105 installs the received program.

Then, the packet communication apparatus 101 terminates the NIF addition process.

Next, the effect of the packet communication apparatus 101 according to the embodiment will be described.

Here, the explanation will be made by using the packet communication apparatus 101 comprising the network interface 105 having a notifying program.

Note that the notifying program installs or uninstalls a transferring program to or from the network interface 105 when an event meeting predetermined conditions occurs.

Note that the event meeting predetermined conditions includes an installing event or an uninstalling event. For example, the installing event occurs when the network interface 105 receives a packet having the specified characteristics, and the like. The uninstalling event occurs when a predetermined period of time elapses, a predetermined time comes, or the like.

The transferring program transfers a packet received by the network interface 105 to the function enhancement module 108. Note that the transferring program may perform an encapsulation process, an encryption process, a decryption process and/or a copy process, prior to transferring the packet to the function enhancement module 108.

Figure 21A:
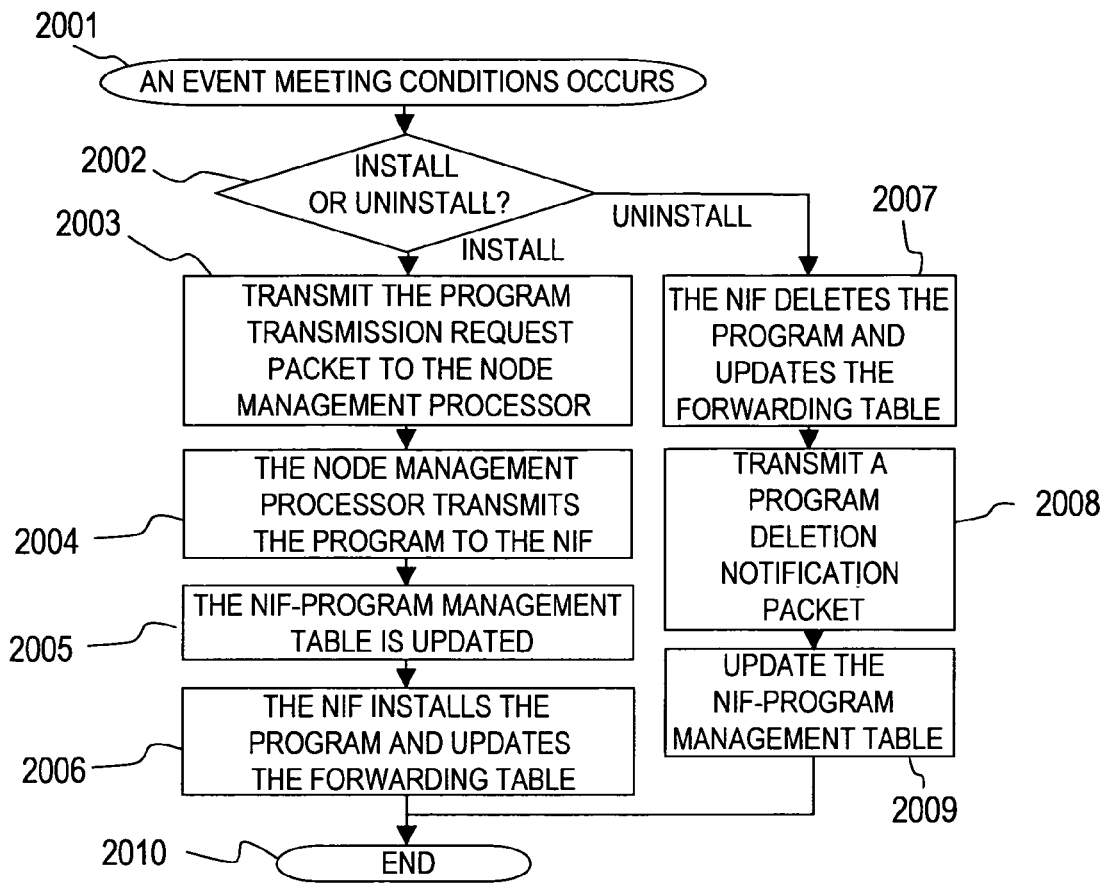
FIG. 21A is a flow chart of an event process of the packet communication apparatus according to the embodiment of the present invention.

FIG. 21A is a flow chart of an event process of the packet communication apparatus 101 according to the embodiment of the present invention.

First, when the network interface 105 detects the event meeting predetermined conditions, the packet communication apparatus 101 starts the event process (2001). Here, the network interface 105 may notify the operator control terminal 103 of the occurrence of the event.

The network interface 105 determines which of the installing event or the uninstalling event the event that has occurred is (2002).

If the event that has occurred is the installing event, the network interface 105 transmits the program transmission request packet to the node management processor 102 (2003).

The program transmission request packet requests the node management processor 102 to transmit the transferring program.

Figure 21B:
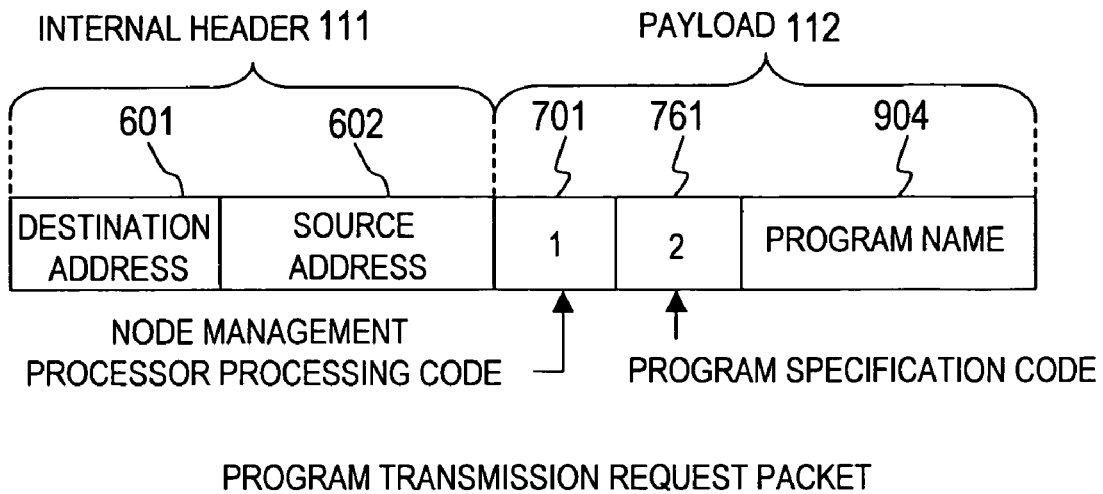
FIG. 21B is a configuration diagram of the program transmission request packet according to the embodiment of the present invention.

FIG. 21B is a configuration diagram of the program transmission request packet according to the embodiment of the present invention.

The program transmission request packet is configured by the internal header 111 and the payload 112.

The internal header 111 contains the destination address 601 and the source address 602.

The destination address 601 is the internal address of the unit which receives the packet in the apparatus. The source address 602 is the internal address of the unit which transmits the packet in the apparatus.

The destination address 601 is the internal address of the node management processor 102 in the program transmission request packet. Further, the source address 602 is the internal address of the network interface 105 in the program transmission request packet.

The payload 112 contains the node management processor processing code 701, the program specification code 761, and the program name 904.

The network interface 105 produces the payload 112 of the program transmission request packet in the following manner.

First, the network interface 105 selects a record, in which the content to a process that the node management processor 102 is requested to perform matches the process content 702 in the node management processor processing code management table 700, from the node management processor processing code management table 700. Then, the node management processor processing code 701 is extracted from the selected record. Then, the extracted node management processor processing code 701 is stored in the payload 112 of the packet.

The program transmission request packet requests the node management processor 102 to transmit the transferring program. Therefore, the function enhancement module 108 stores "1" as the node management processor processing code 701 in the payload 112 of the packet.

Next, the network interface 105 selects a record, in which the program that the network interface 105 requests to install matches the transmission program 762 in the program specification code management table 760, from the program specification code management table 760. Then, the program specification code 761 is extracted from the selected record. Then, the extracted program specification code 761 is stored in the payload 112 of the packet.

The program transmission request packet in FIG. 21B specifies the transferring program by using the payload. Therefore, the network interface 105 stores "2" as the program specification code 761 in the payload 112 of the packet.

Further, the network interface 105 stores the program name 904 of the transferring program in the payload 112 of the packet.

Here, the explanation will be made with reference to FIG. 21A again.

The node management processor 102 receives the program transmission request packet from the network interface 105, and then extracts the node management processor processing code from the payload 112 of the received program transmission request packet.

Next, the node management processor 102 selects a record, in which the extracted node management processor processing code matches the node management processor processing code 701 in the node management processor processing code management table 700 (FIG. 5A), from the node management processor processing code management table 700. Then, the process content 702 is extracted from the selected record.

Then, the node management processor 102 performs a process associated with the extracted process content 702. In this case, since the node management processor processing code is "1", the node management processor 102 transmits the program to the network interface 105.

Specifically, the node management processor 102 extracts the program specification code from the payload of the received program transmission request packet.

Next, the node management processor 102 selects a record, in which the extracted program specification code matches the program specification code 761 in the program specification code management table 760, from the program specification code management table 760. Then, the transmission program 762 is extracted from the selected record.

Next, the node management processor 102 identifies the program to be transmitted to the network interface 105 on the basis of the extracted transmission program 762.

In this case, since the extracted program specification code is "2", the node management processor 102 extracts the program name 904 from the received program transmission request packet. Then, the node management processor 102 transmits the transferring program having the extracted program name 904 to the network interface 105 (2004). Note that, the node management processor 102 transmits the transferring program by using the program install request packet (FIG. 19A).

Next, when the node management processor 102 transmits the program install request packet, the node management processor 102 updates the NIF-program management table 800 (2005). Note that the update process for the NIF-program management table 800 is identical to Step 1316 of the NIF addition process (FIG. 15). Therefore, the explanation thereof is omitted.

On the other hand, the network interface 105 receives the program install request packet from the node management processor 102, and then extracts the NIF processing code from the payload 112 of the received program install request packet.

Next, the network interface 105 selects a record, in which the extracted NIF processing code matches the NIF processing code 741 in the NIF processing code management table 740, from the NIF processing code management table 740. Then, the network interface 105 extracts the NIF processing content 742 from the selected record, and then performs a process associated with the extracted NIF processing content 742.

Specifically, since the extracted NIF processing code 741 is "0", the network interface 105 determines the received packet as the program install request packet. Therefore, the network interface 105 extracts the program 903 from the payload 112 of the received program install request packet, and then installs the extracted program 903.

Further, the network interface 105 updates the forwarding table 401 (2006). Note that the update process for the forwarding table 401 is identical to Step 1318 of the NIF addition process (FIG. 15). Therefore, the explanation thereof is omitted.

Then, the packet communication apparatus 101 terminates the event process (2010).

On the other hand, if the event that has occurred is the uninstalling event in Step 2002, the network interface 105 deletes the transferring program stored in the program memory 304. Further, the network interface 105 updates the forwarding table 401 (2007).

Specifically, the network interface 105 selects a record, in which the program name of the deleted transferring program is stored in the process content 403 in the forwarding table 401, from the forwarding table 401. Then, the network interface 105 deletes the selected record from the forwarding table 401.

Next, the network interface 105 transmits a program deletion notification packet to the node management processor 102 (2008).

Figure 21C:
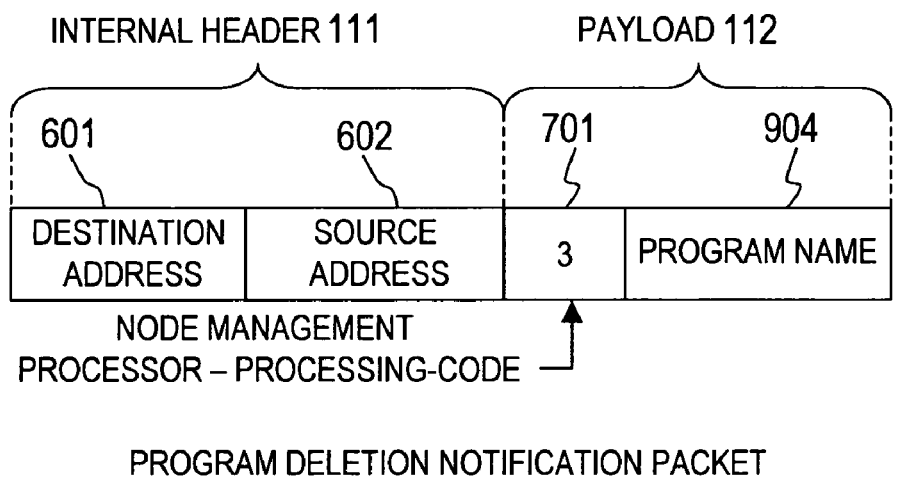
FIG. 21C is a configuration diagram of a program deletion notification packet according to the embodiment of the present invention.

FIG. 21C is a configuration diagram of the program deletion notification packet according to the embodiment of the present invention.

The program deletion notification packet notifies the node management processor 102 of the deletion of the program.

The program deletion notification packet is configured by the internal header 111 and the payload 112.

The internal header 111 contains the destination address 601 and the source address 602.

The destination address 601 is the internal address of the unit which receives the packet in the apparatus. The source address 602 is the internal address of the unit which transmits the packet in the apparatus.

The destination address 601 is the internal address of the node management processor 102 in the program deletion notification packet. Further, the source address 602 is the internal address of the network interface 105 in the program deletion notification packet.

The payload 112 contains the node management processor processing code 701 and the program name 904.

The network interface 105 produces the payload 112 of the program deletion notification packet in the following manner.

First, the network interface 105 selects a record, in which the content of a process that the node management processor 102 is requested to perform matches the process content 702 in the node management processor processing code management table 700, from the node management processor processing code management table 700. Then, the node management processor processing code 701 is extracted from the selected record. Then, the extracted node management processor processing code 701 is stored in the payload 112 of the packet.

The program deletion notification packet notifies the node management processor 102 of the deletion of the program, and then requests the node management processor 102 to update the NIF-program management table 800. Therefore, the network interface 105 stores "3" as the node management processor processing code 701 in the payload 112 of the packet.

Next, the network interface 105 stores the program name 904 of the transferring program deleted from the program memory 304 in the payload of the packet.

Here, the explanation will be made with reference to FIG. 21A again.

The node management processor 102 receives the program deletion notification packet from the network interface 105, and then extracts the node management processor processing code from the received program deletion notification packet.

Next, the node management processor 102 selects a record, in which the extracted node management processor processing code matches the node management processor processing code 701 in the node management processor processing code management table 700 (FIG. 5A), from the node management processor processing code management table 700. Then, the process content 702 is extracted from the selected record.

Then, the node management processor 102 performs a process associated with the extracted process content 702. In this case, since the extracted node management processor processing code is "3", the node management processor 102 updates the NIF-program management table 800 (2009).

Specifically, the node management processor 102 extracts the program name 904 from the payload 112 of the received packet, and further extracts the source address 602 from the internal header 111 of the received packet. Next, the node management processor 102 selects a box, in which the extracted program name 904 matches the program name 801 in the NIF-program management table 800, and further the NIF number associated with the extracted source address 602 matches the NIF number 802 in the NIF-program management table 800, from the NIF-program management table 800. Then, a round mark stored in the selected box is deleted.

Then, the packet communication apparatus 101 terminates the event process (2010).

As described above, the NIF having the notifying program installed installs the transferring program as needed. Therefore, the program memory 304 can be effectively utilized.

Further, in the case where the notifying program receives a packet that the network interface 105 can not process, the notifying program can notify the operator control terminal 103 of the fact that there is a possibility of wrong setting. In this case, when the operator control terminal 103 receives the fact that there is a possibility of wrong setting, the operator control terminal 103 displays the content of the notification. Therefore, the operator can immediately find and solve the wrong setting of the packet communication apparatus 101.

Moreover, the notifying program can also install the transferring program when a constant period of time elapses, a predetermined time comes, or the like. In this case, the transferring programs can be installed to all the network interfaces 105 all at once. Therefore, the load imposed on the operator can be lightened because it is not necessary for the operator to change the setting of each network interface 105.

The packet communication apparatus of the present invention is applicable to nodes that are directly connected with a user.

What is claimed is:

1. A packet communication system, comprising:
a packet communication apparatus including a node management processor for controlling the packet communication apparatus, network interfaces for transmitting and receiving packets to and from external networks, at least one function enhancement module for performing predetermined processes on the packets, and a switch for transferring the packets within the packet communication apparatus;
a terminal for transmitting and receiving the packets to and from the packet communication apparatus; and
a first external network for connecting the packet communication apparatus with the terminal, wherein
the at least one function enhancement module stores a program stored in a first memory,
each of the network interfaces includes a CPU and a second memory,
the program stored in the at least one function enhancement module is installed in the second memory of each network interface,
the CPU of each network interface processes the packets received from the external networks by executing the program installed in the second memory of the network interface,
the node management processor receives update information for updating the program installed in the second memory of each network interface from the at least one function enhancement module, obtains the program from the at least one function enhancement module which is identified on the basis of the received update information, stores the program, and transmits the obtained program to the network interfaces, and
the at least one function enhancement module processes the packet processed by the CPU of each network interface by executing the program updated by the at least one function enhancement module.

2. A packet communication apparatus comprising:
a node management processor for controlling the packet communication apparatus;
network interfaces for transmitting and receiving packets to and from external networks;

at least one function enhancement module for performing predetermined processes on the packets; and a switch for transferring the packets within the packet communication apparatus, wherein the at least one function enhancement module stores a program stored in a first memory, each of the network interfaces includes a CPU and a second memory, the program stored in the at least one function enhancement module is installed in the second memory of each network interface, and the CPU of each network interface processes the packets received from the external networks by executing the program installed in the second memory of the network interface, the node management processor receives update information for updating the program installed in the second memory of each network interface from the at least one function enhancement module, obtains the program from the at least one function enhancement module which is identified on the basis of the received update information, stores the program, and transmits the obtained program to the network interfaces, and the at least one function enhancement module processes the packet processed by the CPU of each network interface by executing the program updated by the at least one function enhancement module.

3. The packet communication apparatus according to claim 2, wherein the update information includes at least one of the program, information relating to the at least one function enhancement module storing the program, and information representing characteristics of the program.

4. The packet communication apparatus according to claim 3, further comprising an intra-node memory for storing at least one of the program and the information relating to the at least one function enhancement module storing the program which are included in the update information received by the node management processor.

5. The packet communication apparatus according to claim 3, wherein the network interfaces are connected with servers and nodes placed outside the packet communication apparatus through the external networks, and the information relating to the at least one function enhancement module storing the program is location information of a server storing the program or a node storing the program which is placed outside the packet communication apparatus.

6. The packet communication apparatus according to claim 2, wherein the node management processor receives the program from the at least one function enhancement module, and transmits the received program to one of the network interfaces.

7. The packet communication apparatus according to claim 2, wherein the node management processor receives the program from the at least one function enhancement module, identifies from the network interfaces a network interface, which is to be a destination for the received program, on the basis of the received update information, and transmits the received program to the identified network interface.

8. The packet communication apparatus according to claim 2, further comprising an intra-node memory for storing information, wherein the intra-node memory stores program management information for managing programs, and the node management processor receives the program from the at least one function enhancement module, identifies from the network interfaces a network interface, which is to be a destination for the received program, on the basis of the program management information, and transmits the received program to the identified network interface.

9. The packet communication apparatus according to claim 8, wherein the program management information includes at least one of information of versions of the programs, information of an association between the network interfaces and the programs, information of an association between the at least one function enhancement module and the programs, and value of a counter for indicating a remaining capacity of the intra-node memory and a quantity of the at least one function enhancement module using the programs.

10. The packet communication apparatus according to claim 9, wherein the intra-node memory stores the programs and/or the information relating to the at least one function enhancement module storing the programs, and the node management processor adds or deletes the program stored in the second memory of each network interface, the programs stored in the intra-node memory, and/or the information relating to the at least one function enhancement module storing the programs stored in the intra-node memory.

11. The packet communication apparatus according to claim 9, wherein upon the node management processor identifying the first network interface which is to be the destination for the received program, the node management processor determines whether or not the received program has already been stored in the second memory of the identified network interface by referring to the program management information, in the case where the received program has already been stored in the second memory of the identified network interface, the node management processor increments the counter included in the program management information, and transmits to the identified network interface information used by the identified network interface in order to transfer a packet to the at least one function enhancement module.

12. The packet communication apparatus according to claim 9, wherein the node management processor decrements the counter included in the program management information upon the at least one function enhancement module being dismounted, and the node management processor requests the network interface storing the program associated with the counter to delete the program when the counter indicates zero.

13. The packet communication apparatus according to claim 2, wherein the program transfers the packets received from the external networks to the at least one function enhancement module.

14. The packet communication apparatus according to claim 2, wherein the program requests one of the network interfaces to add or delete another program in the case where a predetermined period of time elapses or a specified packet is received.

15. The packet communication apparatus according to claim 2, wherein a network interface added to the packet communication apparatus requests to the node management processor for the program, and the program being requested, the node management processor identifies the program to be transmitted to the added network interface on the basis of the received update information, obtains the identified program, and transmits the obtained program to the added network interface.

16. The packet communication apparatus according to claim 15, further comprising an intra-node memory for storing information, wherein the intra-node memory stores program management information for managing programs, and the node management processor identifies at least one function enhancement module storing the identified program on the basis of the program management information.

17. The packet communication apparatus according to claim 16, wherein the network interfaces are connected with servers placed outside the packet communication apparatus and nodes placed outside the packet communication apparatus through the external networks, and the node management processor obtains the identified program from the intra-node memory, the at least one function enhancement module, one of the servers placed outside the packet communication apparatus, or one of the nodes placed outside the apparatus.

18. A method of enhancing functions in a packet communication apparatus comprising a node management processor for controlling the packet communication apparatus, network interfaces for transmitting and receiving packets to and from external networks, at least one function enhancement module for performing predetermined processes on the packets, and a switch for transferring the packets within the packet communication apparatus, wherein the at least one function enhancement module stores a program stored in a first memory, each of the network interfaces includes a CPU and a second memory, the program stored in the at least one function enhancement module is installed in the second memory of each network interface, the CPU of each network interface processes the packets received from the external networks by executing the program installed in the second memory of the network interface, the node management processor receives update information for updating the program installed in the second memory of each network interface from the at least one function enhancement module, obtains the program from the at least one function enhancement module which is identified on the basis of the received update information, stores the program, and transmits the obtained program to the network interfaces, and the at least one function enhancement module processes the packet processed by the CPU of each network interface by executing the program updated by the at least one function enhancement module.

19. The packet communication apparatus according to claim 2, wherein each network interface stores associations between header information, programs to be performed, and destination addresses of the packets, wherein the node management processor updates the associations based on the received update information, and wherein the CPU of each network interface processes a received packet using a program identified as being associated with header information of the received packet in the associations and, upon processing the received packet, transfers the received packet to a function enhancement module of the at least one function enhancement module that stores the identified program according to a destination address associated with the header information of the received packet in the associations.

* * * * *